United States Patent [19]

Osborn et al.

[11] Patent Number: 5,211,271

[45] Date of Patent: * May 18, 1993

[54] LOCKOUT MECHANISM AND SYSTEM FOR VEHICLE SHIFTER

[75] Inventors: Charles Osborn; Andrew K. Ruiter, both of Spring Lake, Mich.

[73] Assignee: Grand Haven Stamped Products Company, Div. of JSJ Corp., Grand Haven, Mich.

[*] Notice: The portion of the term of this patent subsequent to Mar. 17, 2009 has been disclaimed.

[21] Appl. No.: 851,543

[22] Filed: Mar. 13, 1992

Related U.S. Application Data

[63] Continuation-in-part of Ser. No. 642,477, Jan. 17, 1991, Pat. No. 5,096,033.

[51] Int. Cl.$^5$ .................................................. B60K 41/26
[52] U.S. Cl. ........................................ 192/4 A; 74/878
[58] Field of Search ............................. 192/4 A; 74/878

[56] References Cited

U.S. PATENT DOCUMENTS

| | | | |
|---|---|---|---|
| 2,437,406 | 3/1948 | Rogers | 335/255 X |
| 3,710,904 | 1/1973 | Boyer et al. | 192/4 A |
| 3,859,828 | 1/1975 | Ibuka et al. | 70/252 |
| 3,942,614 | 3/1976 | Thompson | 192/4 A |
| 4,096,930 | 6/1978 | Viscardi | 192/4 A |
| 4,126,054 | 11/1978 | Langford et al. | 74/475 |
| 4,187,935 | 2/1980 | O'Hern | 192/4 A |
| 4,235,123 | 11/1980 | Simancik et al. | 74/475 |
| 4,255,984 | 3/1981 | Abels et al. | 74/474 |
| 4,296,847 | 10/1981 | Arndt | 192/4 A |
| 4,473,141 | 9/1984 | Mochida | 192/1 |
| 4,474,085 | 10/1984 | DeVogelaere et al. | 74/475 |
| 4,513,276 | 4/1985 | Kubota et al. | 74/473 |
| 4,520,640 | 6/1985 | Kramer | 292/252 |
| 4,532,824 | 8/1985 | Lamy et al. | 74/475 |
| 4,572,340 | 2/1986 | Pierce | 192/4 C |
| 4,645,046 | 2/1987 | Takano et al. | 192/4 A |
| 4,660,443 | 4/1987 | Simancik | 192/4 A X |
| 4,724,722 | 2/1988 | Beauch et al. | 74/850 |
| 4,768,610 | 9/1988 | Pagel et al. | 192/4 A |
| 4,887,702 | 12/1989 | Ratke et al. | 192/4 A |
| 4,905,802 | 3/1990 | Gotoh | 192/4 A |
| 4,909,096 | 3/1990 | Kobayashi | 192/4 A X |
| 4,919,242 | 4/1990 | Muramatsu et al. | 192/4 A |
| 4,926,688 | 5/1990 | Murasaki | 74/527 |
| 4,930,609 | 6/1990 | Bois et al. | 192/4 A |
| 4,932,493 | 6/1990 | Sakurai et al. | 192/4 A X |
| 4,936,158 | 6/1990 | Livshits et al. | 74/475 |
| 4,938,042 | 7/1990 | Muramatsu | 192/4 A X |
| 4,947,967 | 8/1990 | Kito et al. | 192/4 A |
| 4,947,968 | 8/1990 | Slavin et al. | 192/4 A |
| 4,955,935 | 9/1990 | Katayama | 192/4 A X |

(List continued on next page.)

FOREIGN PATENT DOCUMENTS

| | | |
|---|---|---|
| 50-54733 | 4/1975 | Japan . |
| 53-45573 | 12/1978 | Japan . |
| 56-19451 | 6/1981 | Japan . |
| 57-42424 | 3/1982 | Japan . |
| 57-148222 | 9/1982 | Japan . |
| 57-163427 | 10/1982 | Japan . |
| 59-137234A | 8/1984 | Japan . |
| 59-176253 | 11/1984 | Japan . |

(List continued on next page.)

Primary Examiner—Rodney H. Bonck
Assistant Examiner—Andrea Pitts
Attorney, Agent, or Firm—Price, Heneveld, Cooper, DeWitt & Litton

[57] ABSTRACT

A locking mechanism and system for a vehicle shifter in which the shifting lever is locked in a park lock position until the brakes of the automotive vehicle are applied and the steering lockout mechanism located in the steering column of the vehicle is released by the ignition key of the vehicle. In one embodiment of the invention, two electrical modules are operatively connected to the brake mechanism, the steering mechanism and the ignition key switch which controls the steering lockout mechanism, one of the two modules being controlled by a solid state switch. In other embodiments, a logic control circuit controls a solenoid driving circuit to control the modules.

20 Claims, 19 Drawing Sheets

U.S. PATENT DOCUMENTS

| | | | |
|---|---|---|---|
| 4,966,262 | 10/1990 | Mieczkowski | 192/4 A |
| 4,967,883 | 11/1990 | Kito et al. | 192/4 A |
| 4,976,171 | 12/1990 | Sharp et al. | 192/4 A X |
| 4,981,048 | 1/1991 | Kobayashi et al. | 192/4 A X |
| 4,986,399 | 1/1991 | Gokee | 192/4 A |
| 4,991,700 | 2/1991 | Koga | 192/4 A |
| 5,003,799 | 4/1991 | Imai et al. | 192/4 A X |
| 5,018,610 | 5/1991 | Rolinski et al. | 192/4 A |
| 5,027,929 | 7/1991 | Ratke et al. | 192/4 A |
| 5,058,462 | 10/1991 | Killiany et al. | 192/4 A X |
| 5,062,509 | 11/1991 | Carpenter et al. | 192/4 A |
| 5,096,033 | 3/1992 | Osborn | 192/4 A |

FOREIGN PATENT DOCUMENTS

| | | | |
|---|---|---|---|
| 60-20447 | 2/1985 | Japan . | |
| 60-20448 | 2/1985 | Japan . | |
| 60-23427 | 2/1985 | Japan . | |
| 60-135352 | 7/1985 | Japan . | |
| 61-143825A | 7/1986 | Japan . | |
| 62-20343 | 5/1987 | Japan . | |
| WO9009904 | 9/1990 | PCT Int'l Appl. | 192/4 A |
| 2089450A | 6/1982 | United Kingdom . | |

LOCKOUT MECHANISM AND SYSTEM FOR VEHICLE SHIFTER

This is a continuation-in-part application of U.S. Ser. No. 642,477 filed Jan. 17, 1991, now U.S. Pat. No. 5,096,033.

BACKGROUND OF THE INVENTION

This invention relates generally to a locking mechanism and system for controlling the shifting of a lever for an automotive transmission, and more particularly for such locking mechanism for locking the shift lever in a park position against rotation to other gear positions. More specifically, this invention relates to a locking mechanism and system which is responsive to the application of the brakes of the automotive vehicle and/or to a steering lockout mechanism located in the steering column of a vehicle controlled by the ignition key of the vehicle.

BACKGROUND OF THE INVENTION

In vehicles which are equipped with automatic transmissions, the shifting lever is movable from a park position to other gear positions such as reverse, neutral, drive, second gear and first gear. The shifting lever is generally associated with a detent plate and detent pawl for releasably holding the lever in the park position and an actuator means is provided for actuating the pawl to release the shifting lever for movement to the other gear positions.

In shifting from the park position to the other gear positions, problems have been encountered in the unintended acceleration of the vehicle and, therefore, efforts have been made to prevent the shifting of the shifting lever until the brake pedal had been depressed so that the vehicle will not move before it is intended by the driver.

Further, presently there is in existence steering lockout mechanisms located in the steering column of the vehicle which prevents the shifting lever from being shifted until the steering mechanism is out of lock. In other words, such steering lockout mechanisms prevents the premature acceleration of the vehicle while the steering mechanism is locked. This has been accomplished by a cable extending from the steering lockout mechanism located in the steering column to the transmission shifter. The cable prevents the shifter from being actuated out of the park position until the steering lockout mechanism is released.

The efforts thus far made in developing brake/park lock mechanisms that will prevent the shifting of the shifter lever until such time as the brake is applied have been very complicated, particularly in those transmission shifters in which a detent plate and detent pawl are associated with the shifting lever for releasably holding the lever in the park position. Also, in this type of shifting lever, the mechanism for locking the shifting lever in a park lock position until the brake is applied and before the steering lockout mechanism is released have been very complicated.

Further, attempts to electrify the brake/park lock mechanisms and controls have been hampered by the wide variety of automotive electrical systems. Not only are the circuits wired electrically differently, but most automobile manufactures have their own individual requirements that go beyond the legal requirements. For example, human factors require that any control system developed be "transparent" to an operator, such that the typical operator literally does not know or realize that the system exists. In other words, the automotive manufacturer is requiring a system that is effective, but does not unnecessarily change the operator's driving habits and thus does not unnecessarily frustrate the operator.

The object of the present invention is to provide an improved and simplified, lower cost version of a brake/park mechanism for preventing a driver from shifting a shifter lever from park position to another gear position unless the brake is applied. Another object is to provide an improved combination brake/park lock mechanism and steering lock mechanism which will permit the shifter lever to be shifted out of the park position only when the brake is applied and the steering lock mechanism is released by actuation of the ignition key. Another object is to provide a system that is flexible and can be adapted to a wide variety of specific electrical systems, and which also can be made "transparent" to an operator.

SUMMARY OF THE INVENTION

The above objects of locking the shifting lever in the park position unless the brake is applied is achieved by providing an electrically operated control module mounted on the detent plate and having a pin movable between a distended position to an extended position. This control module is controlled by the application or non-application of the brakes of the vehicle in which the shifter is mounted. When the brakes are not applied, the pin is urged to an extended position. A movable lockout arm is provided adapted to be moved when the pawl is actuated by an actuating means mounted in the shifting lever. The pin of the control module when in extended position prevents the lockout arm from being moved by actuation of the pawl actuator and, accordingly, the pin when extended prevents the shifting of the shifting lever since it cannot be moved out of the park position by reason of the pawl engaging the lockout arm which is prevented from being moved by the pin of the control module. However, when the pin is distended by applying the brakes, it is located out of the path of the lockout arm permitting the actuation of the pawl and the shifting of the shifter lever from park position to the other gear positions.

Our invention includes the dual feature of preventing the shifting of the lever shifter from park position to another gear position unless the brake is applied and the steering lockout mechanism located in the steering column is released. We provide a control circuit including a transaxle position switch operably connected to a shifter lever, a brake switch, a brake control module for controlling a shifter lockout means on the shifter lever, an ignition control module for controlling movement of an ignition key and steering lockout mechanism, and a switch means. The switch means receives signals from the transaxle switch and brake switch to control the brake control module and thus in turn the shifter lockout means and shifter lever. The switch means also receives signals from the transaxle position switch to control the ignition control module and thus the movement of the ignition key and the operation of the steering lockout mechanism. The switch means can be operated mechanically, electrically (such as by solenoids or magnetic reeds), electronically (such as by solid state circuitry) or a combination of such means.

In one aspect, our invention includes a control circuit including a logic circuit and a driving circuit. The logic circuit is connected to the transaxle position switch and the brake switch and controls the driving circuit in response to signals received from the transaxle position switch and the brake switch. The driving circuit includes switch means for controlling the brake control module and the ignition control module, the switch means being responsive to inputs from the logic circuit. In the preferred embodiment, the logic circuit includes a programmed microcontroller, which is adapted to control solenoid drivers for controlling the brake control module and the ignition control module.

Having briefly described the essential features of our invention, the following drawings together with the more detailed description will serve to explain the concepts and principles of the invention.

DESCRIPTION OF THE PREFERRED EMBODIMENTS

Figure 1:
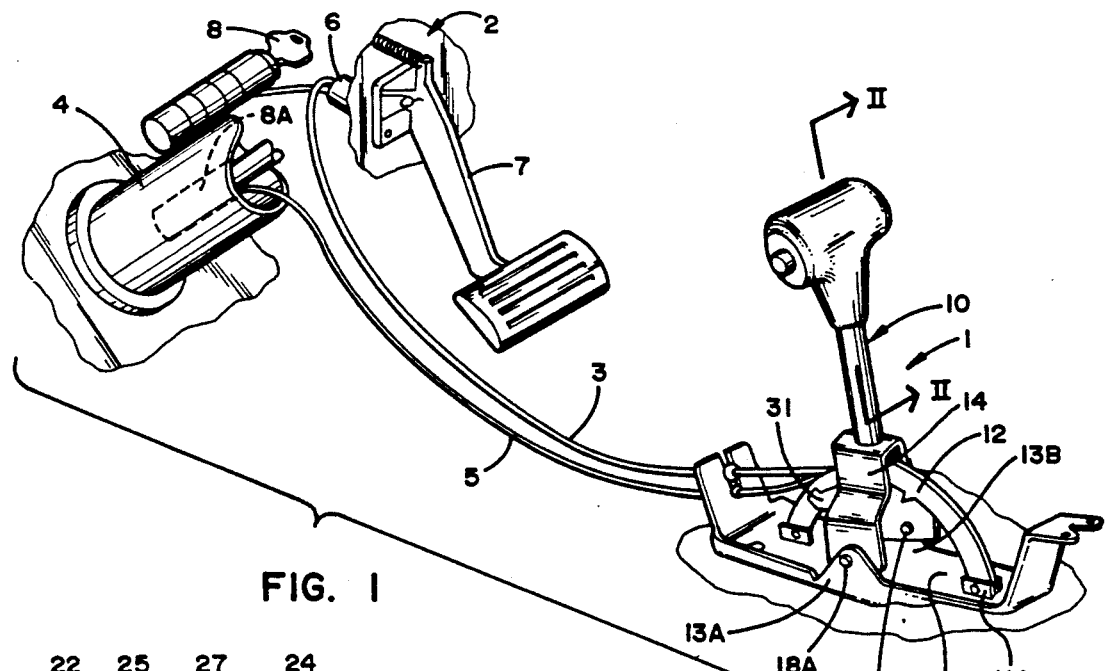
FIG. 1 is a perspective of the vehicle transmission shifter embodying the present invention shown in conjunction with an illustration of a steering column and brake.

Referring to the drawings and particularly FIG. 1, reference numeral 1 designates an automatic shifting mechanism for an automotive vehicle operatively connected to a brake mechanism 2 by an electrical cord 3 and to a lockout mechanism located in steering column 4 by an electrical cord 5. The brake 2 is adapted by well-known means to actuate a switch 6 for controlling the on/off flow of current through the electrical cord 3 to the shifting mechanism 1. The steering lockout mechanism (not shown) of a common and conventional design and represented by box 8A is located in the steering column 4. Lockout mechanism 8A locks the steering wheel when the ignition key is in "LOCK" position, all of which is conventional and well-known in the art. The lockout cord 5 is operatively connected to the steering lockout mechanism, such as the ignition key mechanism 8. Cord 5 extends from the steering column to the shifting mechanism 1 and is electrically connected to a brake control module as will be explained hereinafter.

The shifting mechanism 1 is constructed to prevent the shifting of the shifting lever 10 from the park position to other gear positions unless the brake pedal 7 is depressed to actuate the brake switch 6. Further, means is provided to prohibit the shifting of the shifting lever 10 out of the park position unless the steering lock mechanism which prevents the turning of the steering wheel is released to permit the turning of the wheel.

FIGS. 3-7 show one embodiment of the shifting mechanism 1 which includes the base 9 having a pair of spaced ears 11a and 11b supporting a detent plate 12 and spaced ears 13a and 13b supporting the shifting lever 10 by means of the U-shaped carrier 14 and pivot pins 18a and 18b.

Figure 2:
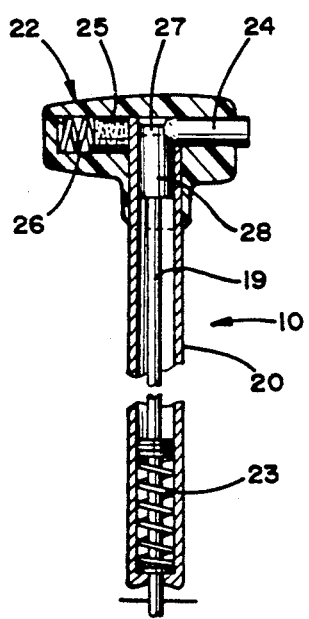
FIG. 2 is a cross-sectional elevational view of the shifter lever taken along the plane II—II and illustrating one mechanism for actuating the detent pawl of the shifter of this invention.
Figure 3:
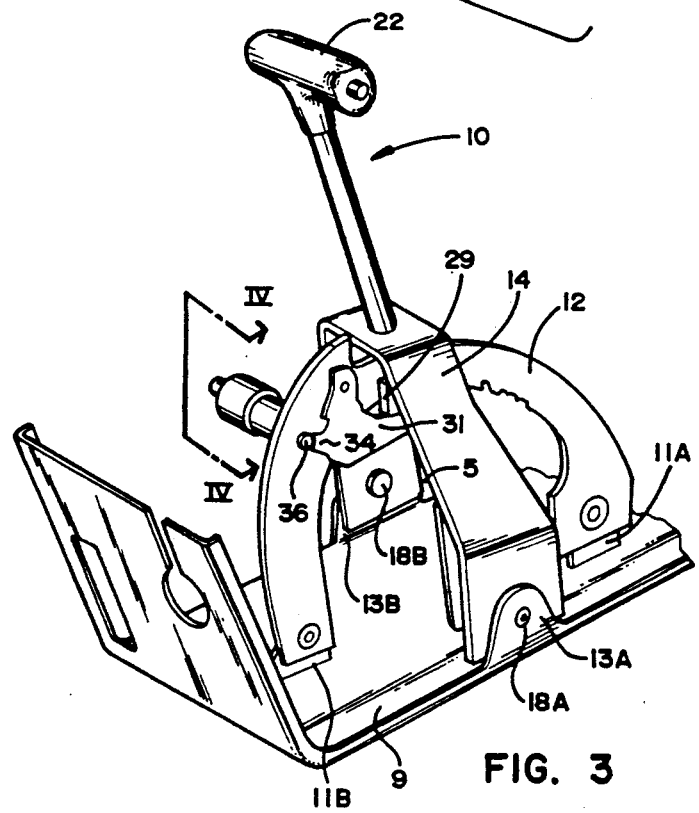
FIG. 3 is a side-elevational perspective view of the shifter of FIG. 1.
Figure 5:
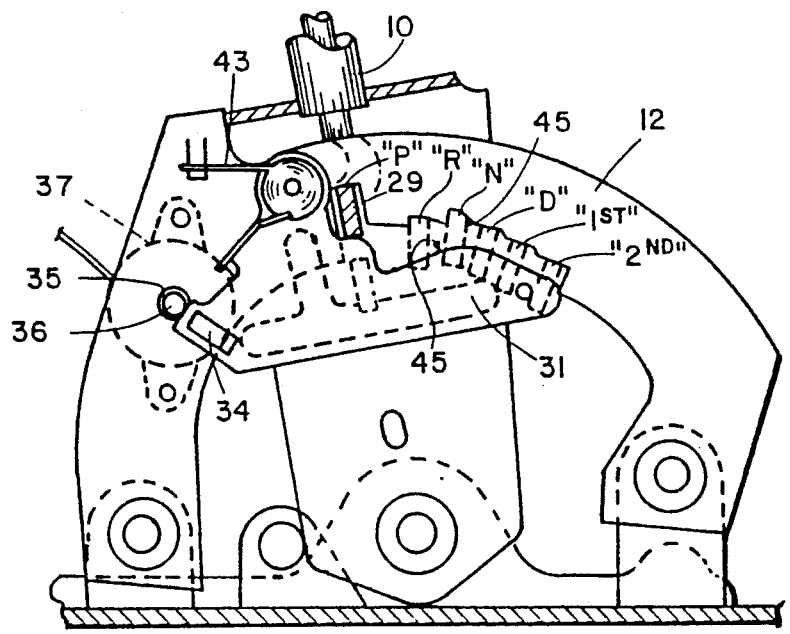
FIG. 5 is a partial side elevational view of the shifter of FIGS. 1 and 3.

Shifting lever 10 as disclosed in FIGS. 1 and 2 is of a conventional type which includes a shaft 19 extending through a tube 20 which is secured to the bight portion of the U-shaped carrier 14. The shaft 19 is slideably mounted in the tube 20. A handle 22 is secured to the top of the tube 20 and provides a housing for the means for actuating the rod or shaft 19 which is biased upwardly into the housing formed by handle 22 by means of the spring 23 and/or coil spring 43 (FIG. 5). The means for actuating rod 19 in a downwardly direction includes the button 24 slideably mounted within the bore 25 and biased outwardly of the bore by means of the spring 26. Button 24 contacts the inclined cam surface 27 of a plunger 28 so that when the button 24 is depressed to overcome the bias of spring 26, the shaft or rod 19 is forced downwardly. A detent pawl 29 is connected to the lower end of the shaft 19 at the juncture of the shaft and the actuating arm 21. Pawl 29 holds the shifting lever 10 in various gear positions as established by the detent plate 12 which will now be described.

Detent plate 12 (FIG. 5) is an arcuate plate having a series of notches designated by the letters "P", "R", "N", "D", "1ST" and "2ND" which designate "PARK", "REVERSE", "NEUTRAL", "DRIVE", "1ST" and "2ND". Thus, as is well known in the art, shifting the shifting lever 10 to each of the notches will shift the automatic transmission to such gear positions.

The above described detent plate 12 and shifting lever 10 including pawl 29, pushbutton 24 and associated parts are generally well known and conventional. One novel feature of FIGS. 3 and 5-7 is the lockout arm 31 providing a lockout means controlled by application of the brakes.

In the embodiment of our invention disclosed in FIGS. 3-13 the brake 7 is required to be applied and the steering lockout mechanism 8 in the steering column 4 released before the shifting lever 10 can be moved out of park "P" to other gear positions. In this embodiment, the conventional lockout cable leading from the steering column to the shifting mechanism has been completely eliminated and in lieu thereof two electrically operated control modules 37 and 50 are provided, one for the brake/park lock mechanism and the other for the steering lockout mechanism. The two modules 37 and 50 are connected in the unique circuit as disclosed in FIGS. 11, 12 and 13 to accomplish this end.

Figure 6:
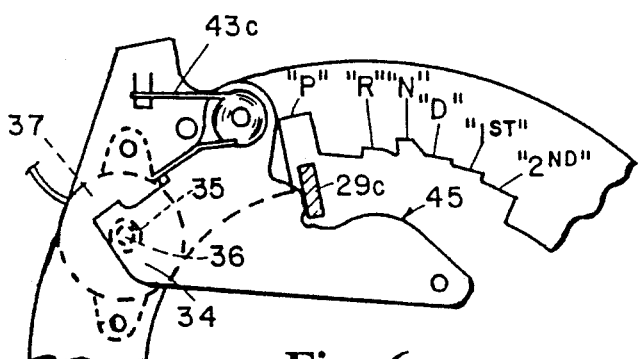
FIG. 6 is a partial side-elevational view of the mechanism of FIG. 5 with the pawl depressed and the lockout arm in unlocked position.
Figure 7:
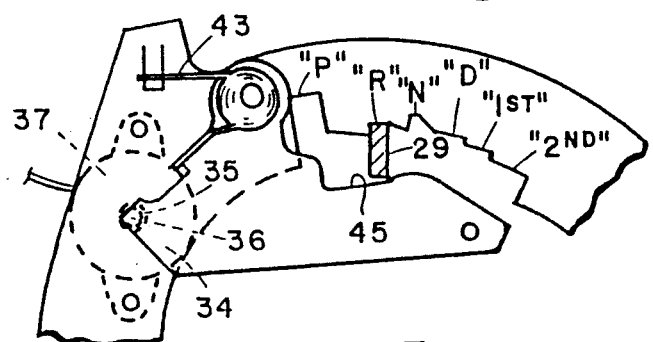
FIG. 7 is a partial side-elevational view of the mechanism of FIG. 5 with the pawl in reverse gear position and the arm in unlocked position.
Figure 15:
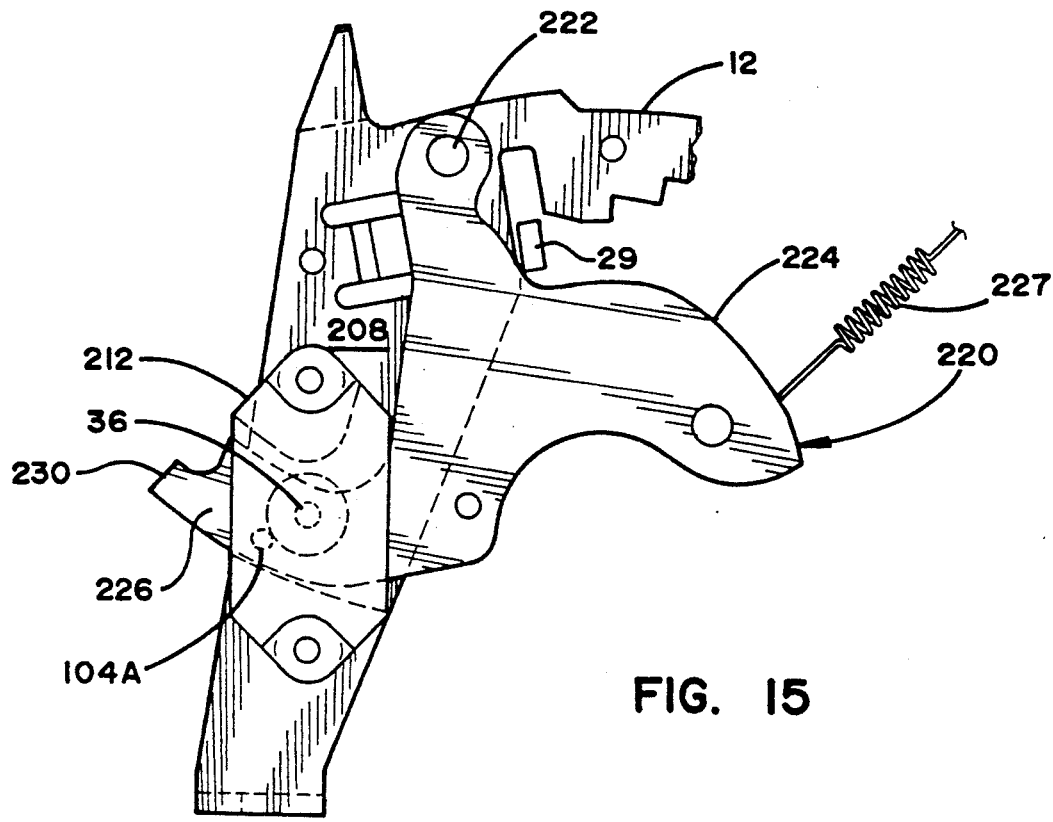
FIGS. 14-16 are side views of a second embodiment of the shifter including a brake control module and a flat crank lockout arm, the flat crank lockout arm being shown in various operative positions relative to the brake control module.

The mechanical mechanism for the brake/park lock mechanism is disclosed in FIGS. 3 and 5-7 which discloses the lockout arm 31 having an end 34 which is blocked or unblocked by the pin 36 the position of which is controlled by the brake control module 37. The lockout arm 31 assures that in all gear positions of the pawl 29, except for the "P" (park) position, the arm includes an area which covers the opening 35 through which the pin 36 can extend so as to prevent the pin 36 from projecting through the opening 35 in extended position. To accomplish this end, the edge 45 of the lockout arm 31c takes the form of a curvilinear shape over which the pawl 29 cams to rotate the lockout arm 31. FIGS. 6 and 7 illustrate this feature of the portion 34 which covers the opening 35 and pin 36 when the pawl 29 is depressed (FIG. 14) and when the pawl 29 is in one of the other gear positions (FIG. 15). It will be noted that the edge 45, although being curvilinear so as to permit the pawl 29 to slide thereover, approximates the shape of the notched edge of the detent plate 12.

Figure 4:
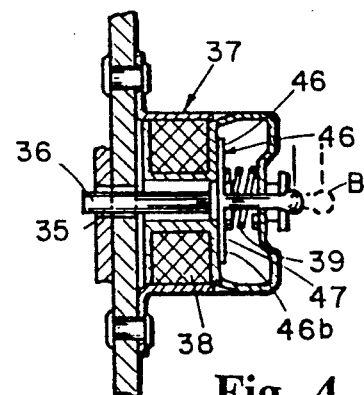
FIG. 4 is a cross-sectional view taken along the plane VI—VI of FIG. 3 showing the electrically operated brake control module of this invention.

FIG. 4 discloses module 37 which includes the solenoid 38, the pin 36 and the switch 46 comprising the switch contacts 46a, 46b adapted to be bridged by contact bar 47 attached to and movable with the pin 36. In the control module 37 pin 36 is biased outwardly to the extended position by means of spring 39 and actuated to the distended position (disclosed by the dotted lines B) by the energization of solenoid 38. The reason for this operation of the control module 37 will be evident upon explanation of the ignition key mechanism 48 of FIGS. 8, 9 and 10 and circuit diagram of FIGS. 11, 12 and 13.

It will be noted that FIGS. 8-13 show the electrically operated control module 50 which is located at the ignition switch and serves the purpose of locking and preventing the actuation of the key switch member to the "LOCK" position except under certain circumstances. It is this ignition control module 50 connected uniquely in a circuit with control module 37 that permits elimination of a lockout cable.

Figure 10:
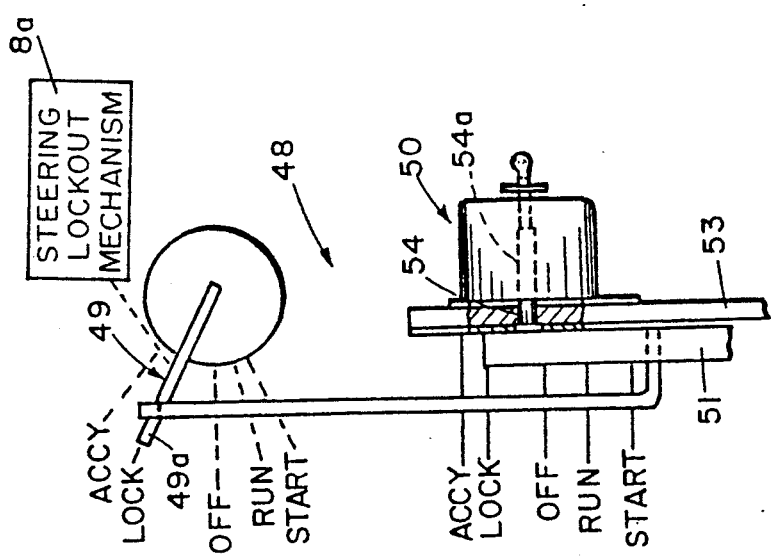
FIGS. 8, 9 and 10 are schematics of a steering lockout mechanism which includes a key switch member, the actuation thereof under certain circumstances being controlled by an ignition control module to block and preventing under such circumstances the actuation of the key switch to the "LOCK" position.
Figure 9:
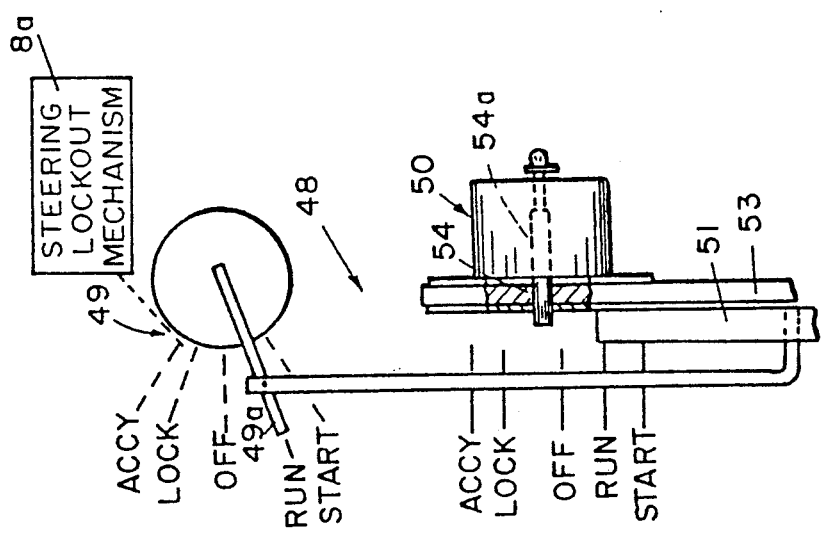
Figure 8:
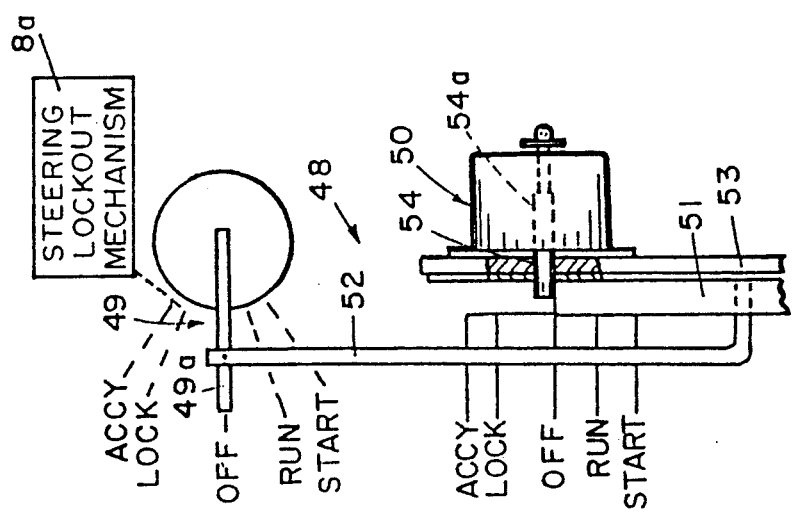

FIGS. 8, 9 and 10 disclose a sketch of an ignition key mechanism 48 the position of which controls in a conventional manner the steering lockout mechanism 8A. Specifically, the mechanism 48 includes a key switch 49 which can be turned to five separate positions, namely, an accessory (ACCY) position, a steering locked (LOCK) position, and OFF position, a RUN position and a START position. Ignition key mechanism 48 includes a key switch member 49a which is movable to the above different positions. A blocking member 51 is connected to member 49a by the link 52 so that the blocking member 51 moves with switch member 49 along a support member 53. The support member includes an opening 54 through which a pin 54a extends when the solenoid 56 (FIGS. 11, 12 and 13) of the ignition control module is de-energized. This is accomplished in substantially the same way as the control module of FIG. 4 except that the control module 50 does not include a switch.

FIGS. 8, 9 and 10 disclose the position of the blocking member 51 in each of three positions, that is, OFF, RUN and LOCK. In the LOCK position of FIG. 10, the steering lockout mechanism 8A located in the steering column prevents the steering wheel from being turned. However, when moved out of the LOCK position to the OFF, RUN or START positions, the steering lockout mechanism 8A in the steering column is released permitting the driver to turn the steering wheel. The safety feature of the mechanism in FIGS. 8, 9 and 10 is to prevent the member 49a from being switched to the LOCK position unless the shifter lever 10 is in park "P" position. FIGS. 8 and 9 disclose the condition of the steering lock mechanism when in the OFF and RUN position wherein the pin 55 is extended to prevent the blocking member 51 and consequently the switch member 49 from returning to the lock position unless the shifting lever 10 of FIG. 13 is in the park "P" position.

Figure 11:
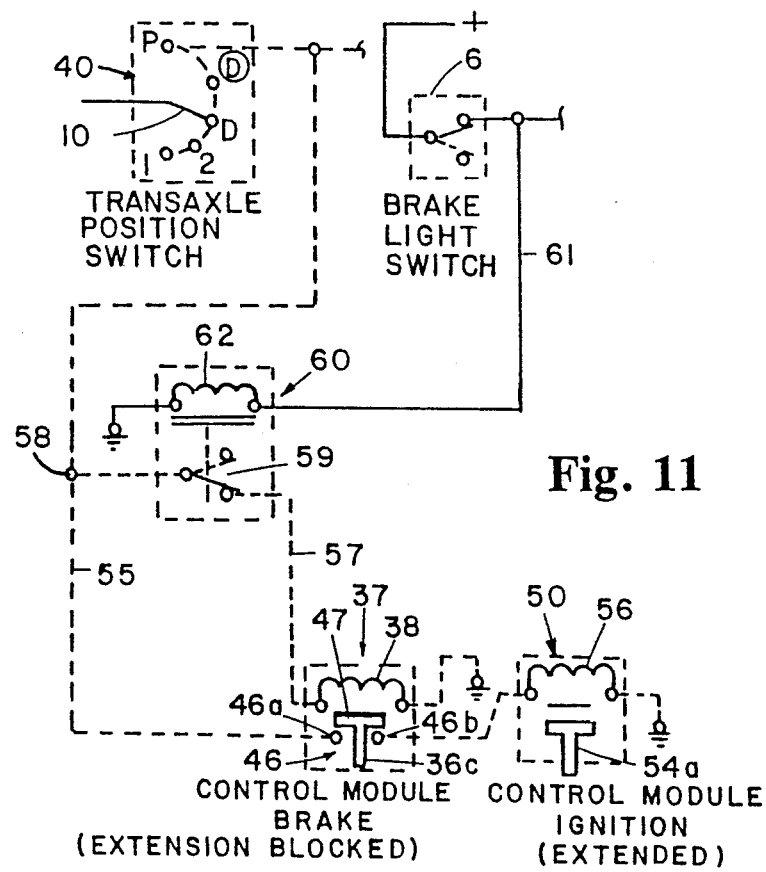
FIG. 11 is an electrical schematic diagram illustrating the current flow and the conditions of the brake/park lockout mechanism and the steering lockout mechanism utilizing the transmission shifter mechanism of FIGS. 5-7 and the steering lock mechanism of FIGS. 8-10 and illustrating the positions of the control modules and current flow through the circuit when the shifter lever is in park gear position with the brake unapplied.
Figure 12:
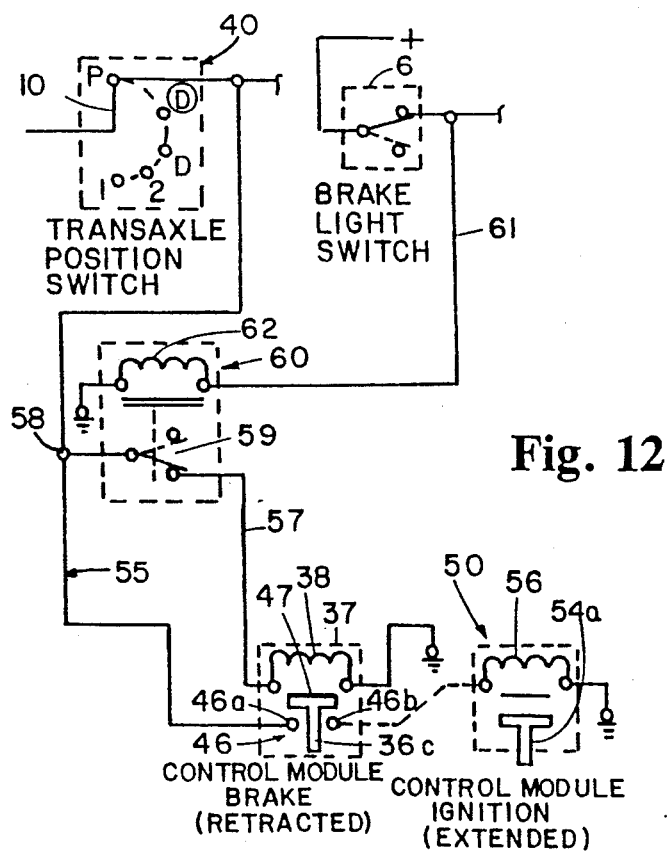
FIG. 12 is the electrical schematic diagram of FIG. 11 illustrating the current flow and the various conditions of the brake/park lockout mechanism and the steering lockout mechanism when the shifting lever is in park gear position with the brake applied.
Figure 13:
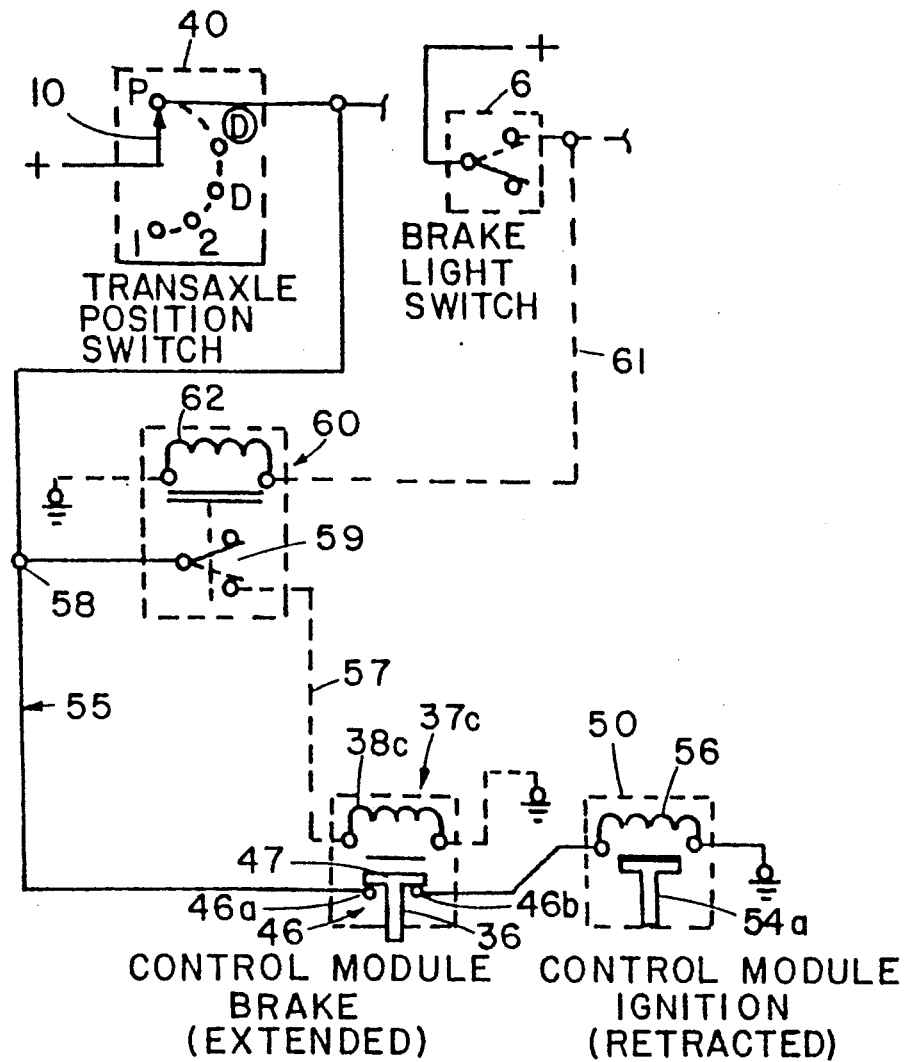
FIG. 13 is the electrical schematic diagram of FIG. 11 illustrating the current flow and conditions of the brake/park lockout mechanism and the steering lockout mechanism when the shifting lever is in drive gear position with the brake applied.

FIGS. 11, 12 and 13 disclose a circuit diagram in which the brake control module 37 and the ignition control module 50 are interrelated within the circuit to accomplish the above object. Referring to FIGS. 11, 12 and 13, reference numeral 40 designates a transaxle position switch which when switch 49 of the vehicle is turned on is connected into the electrical system of the vehicle and permits the flow of current through the switch when the transmission is in the PARK position as determined by the position of the shifting lever 10. The switch of the brake control module comprising the two contact elements 46a and 46b and the contact bar 47, and the solenoid 56 of the ignition control module 50 are located in series with the transaxle position switch 40 to form the circuit 55. A second circuit 57 includes the transaxle position switch 40, the connecting point 58, switch 59 of the relay 60 and the solenoid 38 of the brake control module 37. It should be understood, an equivalent solid state circuit such as an "AND" circuit can be substituted for the relay 60. In either case, the relay 60 and its equivalent solid state circuit is considered to be a "switch means". A third circuit 61 includes the solenoid 62 of the relay 60 and the brake switch 6, one side of which connected to the power source of the vehicle.

FIG. 11 discloses the condition of the circuits with the shifting lever 10 in the PARK gear position of FIG. 5 and the brake off. In this mode, the circuit 55 is closed through the transaxle position switch, the switch 46 of the brake control module 37 and the solenoid 56 of the ignition control module 50. The closing of circuit 55 causes pin 54a to be withdrawn as disclosed in FIG. 11. In this condition, the switch member 49 can be actuated to any one of the positions of the ignition key mechanism 48. However, the pin 36 of brake module 37 is biased into extended position since both of the circuits 57 and 61 are open. As a result, the lockout arm 31 is prevented from being rotated by the pawl 29 since the end of arm 31 engages the pin 36 and, accordingly, the shifting lever 10 cannot be shifted to the other gear positions since the pawl 29 is locked in the notch "P", that is, in the PARK position.

Figure 16:
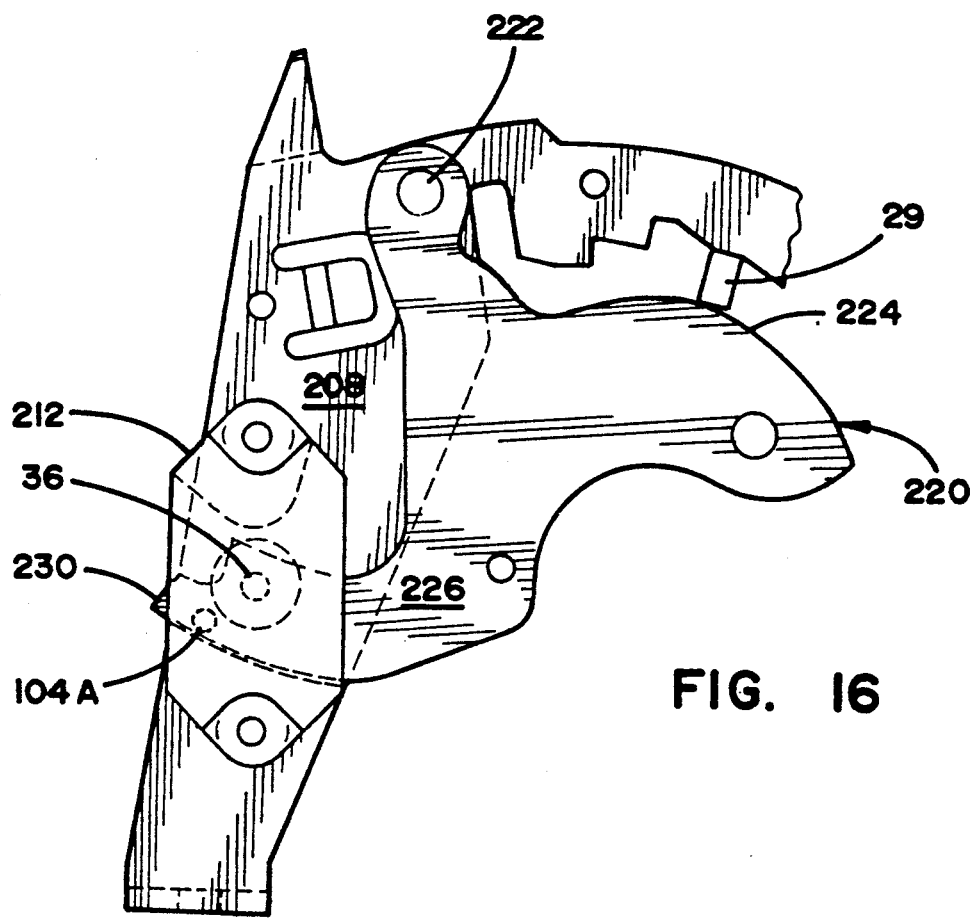
Figure 17:
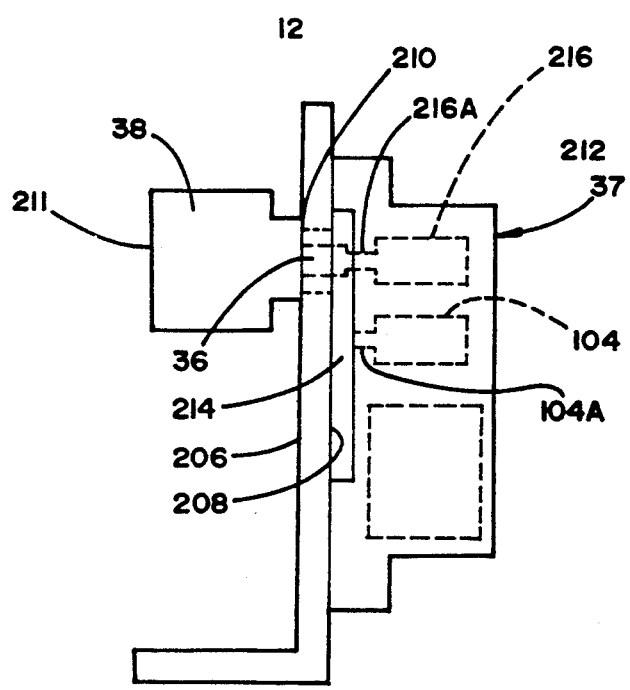
FIG. 17 is a front schematic view of the brake control module shown in FIGS. 14-16.

When the brake is applied, the brake switch 6 is closed (FIG. 12) closing the circuit 61 and energizing the solenoid 62 of the relay 60. This causes switch 59 of the relay 60 to close, thereby closing the circuit 57 through the solenoid 38 of the brake control module 37 which opens the switch 46 and retracts pin 36. The opening of switch 46 de-energizes solenoid 56 of the ignition control module 50 causing pin 54a to be forced by a spring toward the extended position of the pin 54a. Assuming key switch 49 is in LOCK position as disclosed in FIG. 18, the blocking member 51 is located in the path of the pin 54a which does not restrict the switch member 49 from being switched to "OFF", "RUN", or "START". In the LOCK position, the steering lockout mechanism located in the steering column prevents the operator of the vehicle from turning the wheel. However, turning the key to the "OFF", "RUN", or "START" position, actuates the blocking member 51 to a position out of the path of the pin 54a permitting the spring (not shown) to force the pin outwardly to extend the pin to the positions as shown in FIGS. 16 and 17. In these positions, the pin 54a and blocking member 51 prevent the key switch member 49a from being actuated to the "LOCK" position. In the condition as disclosed in FIG. 12, the circuits permit the shifting lever 10 to be shifted from "PARK" to the other gear positions since the pin 36 has been withdrawn and the ignition control module is set to prevent the key switch member to be moved to the locked position.

FIG. 13 discloses the condition of the circuits 55, 57 and 61 after the shifting lever 10 is shifted to one of the other gear positions "R", "N", "D", "1ST" or "2ND". The shifting of the shifting lever to any of these other gear positions opens the transaxle position switch thereby opening both circuits 55 and 57. Circuit 61 is rendered either open or closed, depending upon whether the brake is depressed. However, although closing circuit 61 will close switch 59 of the relay 60 since no power is applied to either circuits 55 or 57, depression of the brakes will have no affect on the locking out mechanism.

Of utmost importance during the driving of the vehicle in any of the other gear positions, is that the pin 36 of the brake control module 37 be prevented from extending through the opening 35 (FIGS. 6 and 7). As previously disclosed, FIGS. 6 and 7 show the position of the arm portion 34 which covers the opening 35 in any one of the other gear positions thus preventing pin 36 from extending outwardly and interfering with the operation of the shifting lever 10.

It should be understood that once the shifting lever 10 is shifted back to the PARK position of FIG. 5, pin 36 is forced outwardly into extended position by the spring 39 (FIGS. 4 and 5) to once again lock the shifter into the park "P" gear position.

MODIFIED LOCKOUT ARM ARRANGEMENT

FIGS. 14-17 disclose a modified lockout arm arrangement which includes a shift button position switch 104 actuated by the modified lockout arm 220. This arrangement is utilized in the modified circuits as will be described hereinafter.

Referring to FIG. 17, detent plate 12 extends upwardly and provides side mounting surfaces 206 and 208 with an aperture 210 extending therethrough. A solenoid housing 21 including solenoid coil 38 mounts to side surface 206 with pin 36 extending through aperture 210. A housing 212 mounts to side surface 208 and defines a slot 214 between housing 212 and side surface 208.

Housing 212 provides an enclosure for control circuitry described in the modified circuits below. A microswitch or reed switch 216 for sensing the extension of pin 36 is also located in housing 212 along with shift button position switch 104. Thus a significant portion of the control circuitry is located in housing 212 providing assembly and packaging advantages. Notably, switch 216 replaces switch 46 thereby eliminating the need for switch contacts 46a and 46b and permitting purchase of less expensive components. Switch 216 includes a pin 216a operably connected to switch 216 and positioned to be contacted by the end of pin 36 as pin 36 is extended.

Figure 14:
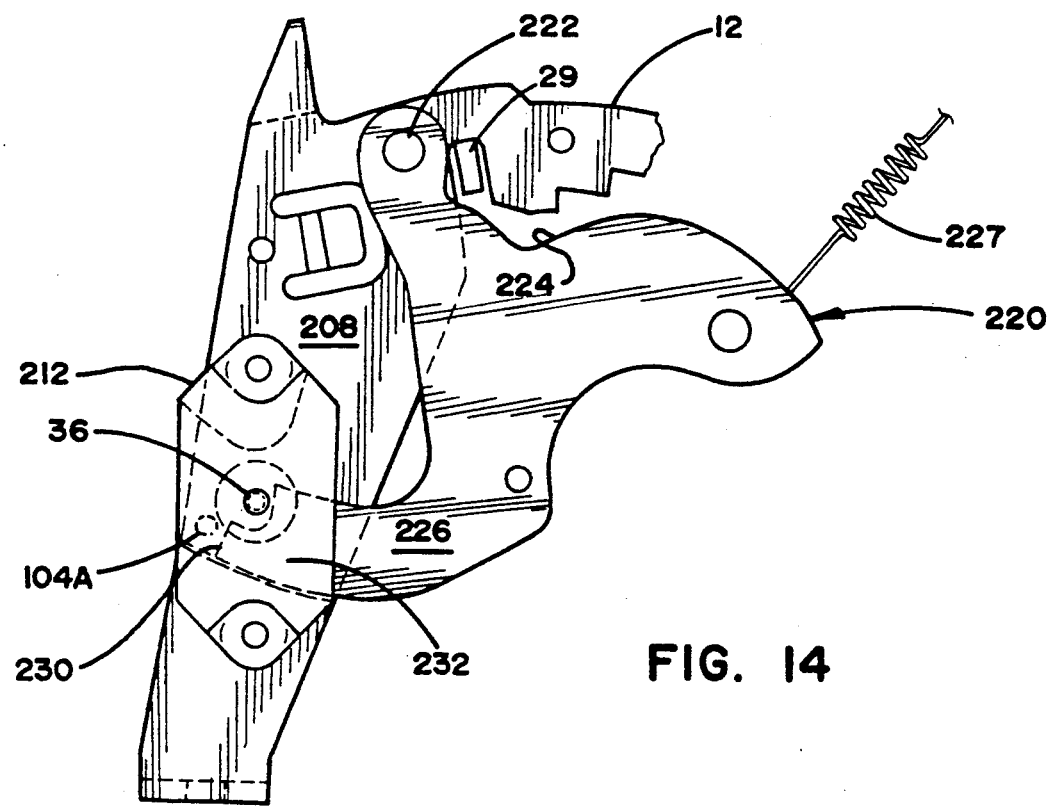

The lockout arm or so called crank 220 (FIG. 14) is operably pivotally connected to detent plate 12 by pivot pin 222. Lockout arm 220 includes an upper shaped surface 224 that is shaped to be engaged by pawl 29 when button 24 is pressed to disengage pawl 29 so that shifter lever 10 can be moved from "PARK" position. Arm 220 includes a leg 226 that extends laterally into slot 214 (FIG. 17) formed between housing 212 and side surface 208 of detent plate 12. As button 24 of the shifter (FIG. 2) is pressed and pawl 29 is lowered, the arm or crank 220 swings over pin 36 preventing extension of pin 36 (FIG. 15). Also, leg 226 swings past the end 104A of button position switch 104 causing same to open. Switch 104 can be a cam actuated switch, a magnetic reed switch or any switch adapted to be actuated by leg 226. As shown in FIGS. 14-16, the terminal end 230 of leg 226 is shaped to first cover pin 36 and then slightly later contact button position switch 104. However, it is contemplated that terminal end 230 could be reshaped and/or button position switch 104 could be relocated so that they are actuated at whatever time is desired. For example, button position switch 104 could be relocated to a position 232 (FIG. 14) whereat button position switch 104 would be actuated at the end of the downward stroke of pawl 29. Also, a second switch (not shown) could be added in housing 212 at position 232 and a hole (not shown) added to leg 226 such as to indicate that pawl 29 is in the "NEUTRAL" position.

Shaped surface 224 is shaped to position crank 220 in the desired rotational position with respect to pin 36 and button position switch 104 as pawl 29 is depressed (lowered) and then moved along detents "PRND D₁D₂" in detent plate 12. In FIG. 14, arm 220 is shown with pawl 29 in the fully raised position in "PARK" position. In FIG. 15, arm 220 is shown with pawl 29 fully depressed (lowered) and with leg 226 covering pin 36 and button position switch 104. In FIG. 16, arm 220 is shown with panel 29 in the "DRIVE" position. Arm 220 is biased toward the home or "PARK" position such as by a spring 227 (FIG. 14).

Figure 18:
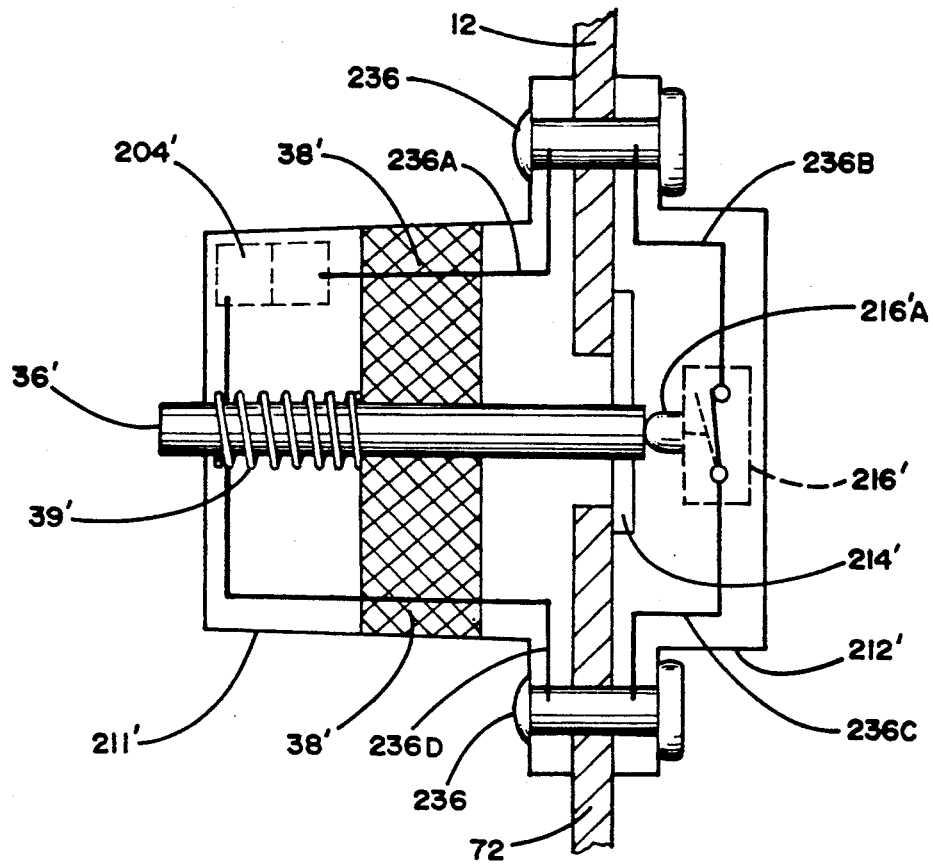
FIG. 18 an enlarged sectional front view of another embodiment of the brake control module shown in FIG. 17.

An enlarged cross-sectional view of another embodiment of the brake control module is shown in FIG. 18. In this embodiment, parts and components similar to those shown in FIG. 17 are shown with a prime after the number, such as 212', 214', and the like. In FIG. 18, a slot 214' is formed for receiving leg 226 of arm 220. Pin 36' is extended and thus closes switch 216' in housing 212' indicating shifter lever 10 is locked in the "PARK" position. In the preferred form, housing 212' is secured to the housing 234' of solenoid coil 36' by conductive rivets 236 which eliminate the need for wires running therebetween. Thus components in housings 211' and 212' are electrically connected by rivets 236 and internal wires 236a, 236b, 236c, and 236d to form a portion of the control circuit. Further, solenoid drivers such as drivers 204' (described below) and other components in the circuits are located in housing 211' of solenoid or in housing 212' as desired.

FIRST MODIFIED CIRCUIT

Figure 19:
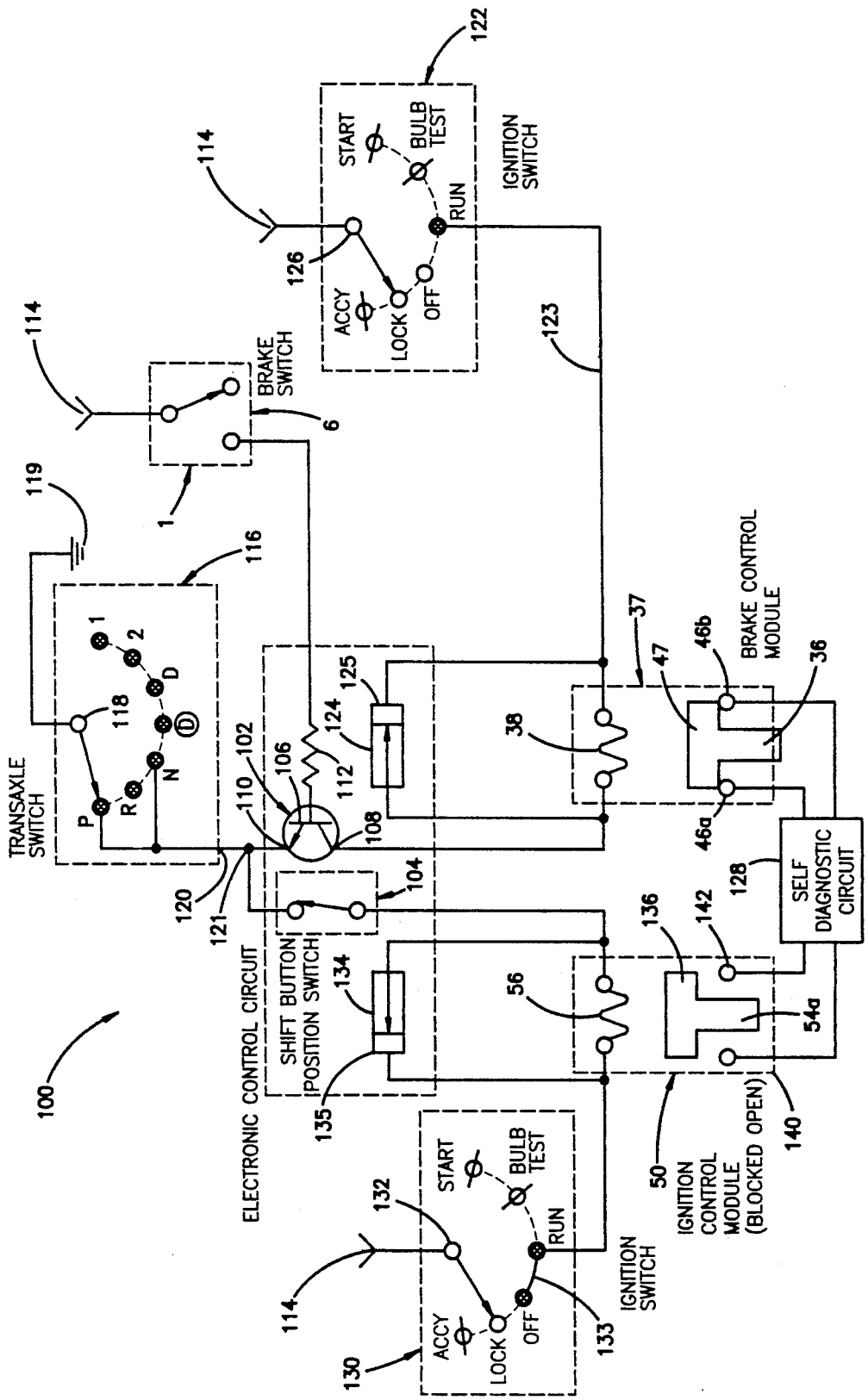
FIG. 19 is an electrical schematic diagram embodying the present invention illustrating a modification of FIG. 11, but with the key in the "LOCK" position.

A control circuit 100 embodying the present invention is illustrated in FIG. 19. Control circuit 100 is a modification of the circuit shown in FIG. 11, circuit 100 including a transistor 102 and a shift button/pawl position switch 104 which further improves the reliability and function of circuit 100.

Transistor 102 is illustrated as an NPN transistor including a base 106, a collector 108 and an emitter 110. Transistor 102 may be provided by any suitable commercially available transistor. Base 106 is connected to brake switch 6 through a base resistor 112. Those skilled in the art will recognize that resistor 112 sets the base current applied to transistor 102. When the brake is pressed, brake switch 6 closes and transistor 102 is activated by electrical energy applied from voltage source or battery 114 through brake switch 6 to base 106.

Transaxle position switch or transmission gear position switch or shift lever position switch 116 includes positions "PARK" (P), "REVERSE" (R), "NEUTRAL" (N), and several drive gear positions. Transaxle switch 116 includes center post connector 118 that leads to ground 119, and is adapted to provide continuity through terminal contacts at "P" and "N" positions to outlet connection 120. Transaxle switch outlet connection 120 is connected to the emitter of transistor 102 at node 121. Notably, use of either transaxle switch 116 or transaxle switch 40 as shown in FIG. 11 does not change the operation of circuit 100. This is because lockout arm 220 both holds pin 36 in the retracted position and also contacts pin 104A thereby holding shift button position switch 104 open once shifter lever 10 is moved out of "PARK" (FIGS. 15 and 16). Thus, the energization or de-energization of coils 38 and 56 is not controlling once shifter lever 10 is moved out of "PARK".

Collector 108 of transistor 102 is connected to solenoid coil 38 of brake control module 37. Solenoid coil 38 is connected to, and receives power from, ignition switch 122 through conductor 123. A suppression diode 124 is connected in parallel with solenoid coil 38 to protect transistor 102 when transistor 102 switches to a non-conductive state. Diode 124 has a cathode 125 connected to ignition switch 122 and an anode connected to collector 108 of transistor 102. When transistor 102 stops conducting, diode 124 shorts coil 38 facilitating the discharge of coil 38.

Ignition switch 122 includes multiple key positions "ACCESSORY" (ACCY), "LOCK", "OFF", "RUN", and "TEST". Ignition switch 122 is connected to voltage source 114 at post connector 126, and provides continuity from post connector 126 to a terminal at the "RUN" position, which is in turn connected to conductor 123. Control module 37 further includes a normally extended pin 36 which retracts in response to energization of solenoid coil 38.

Control module 37 also includes contact bar 47 that closes on and provides continuity across contacts 46a and 46b in response to de-energizing solenoid coil 38 and extending pin 36. In control circuit 100, contacts 46a and 46b are connected to a self diagnostic circuit 128 which can be used to determine if a system malfunction has occurred. Diagnostic circuit 128 includes a telltale system (not shown) to aid mechanics in determining where system problems have occurred.

A second ignition switch 130 is connected through ignition control module 50 and a shift button position switch 104 to node 121. Second ignition switch 130 includes key positions "ACCESSORY" (ACCY), "LOCK", "OFF", "RUN" and "TEST" which are identical to and operated simultaneously with ignition switch 122, but second ignition switch 130 provides continuity from post connector 132 through an enlarged terminal 133 extending along positions "OFF" and "RUN", positions between "OFF" and "RUN", and also part way toward the "LOCK" position. The reason for enlarged terminal 133 is so that second ignition switch 130 will continue to provide power to solenoid coil 56 of ignition control module 50 for a short period as key 8 is moved from "OFF" position toward the "LOCK" position. This allows blocking member 51 (FIG. 10) to extend over opening 54 to prevent pin 54a from prematurely extending and locking key 8 in place before key 8 can be moved to the "LOCK" position whereat key 8 is released and the steering mechanism is locked.

Power is communicated from the enlarged terminal 133 to solenoid coil 56, and from there to shift button position switch 104 to node 121 in series. A suppression diode 134 has a cathode 135 connected to ignition switch 135 and an anode connected to switch 104 to protect switch 104. When switch 104 opens, diode 134 provides a discharge path for the energy stored in relay coil 56. As previously described, shift button position switch 104 is operably connected to pawl 29 or button 24, and is adapted to be normally closed, but switch 104 is opened when button 24 is depressed and pawl 29 is moved downwardly out of engagement with detent plate 12. In particular, lockout arm 220 contacts pin 104a to hold switch 104 open whenever pawl 29 is moved out of the "PARK" detent in detent plate 12.

Figure 20:
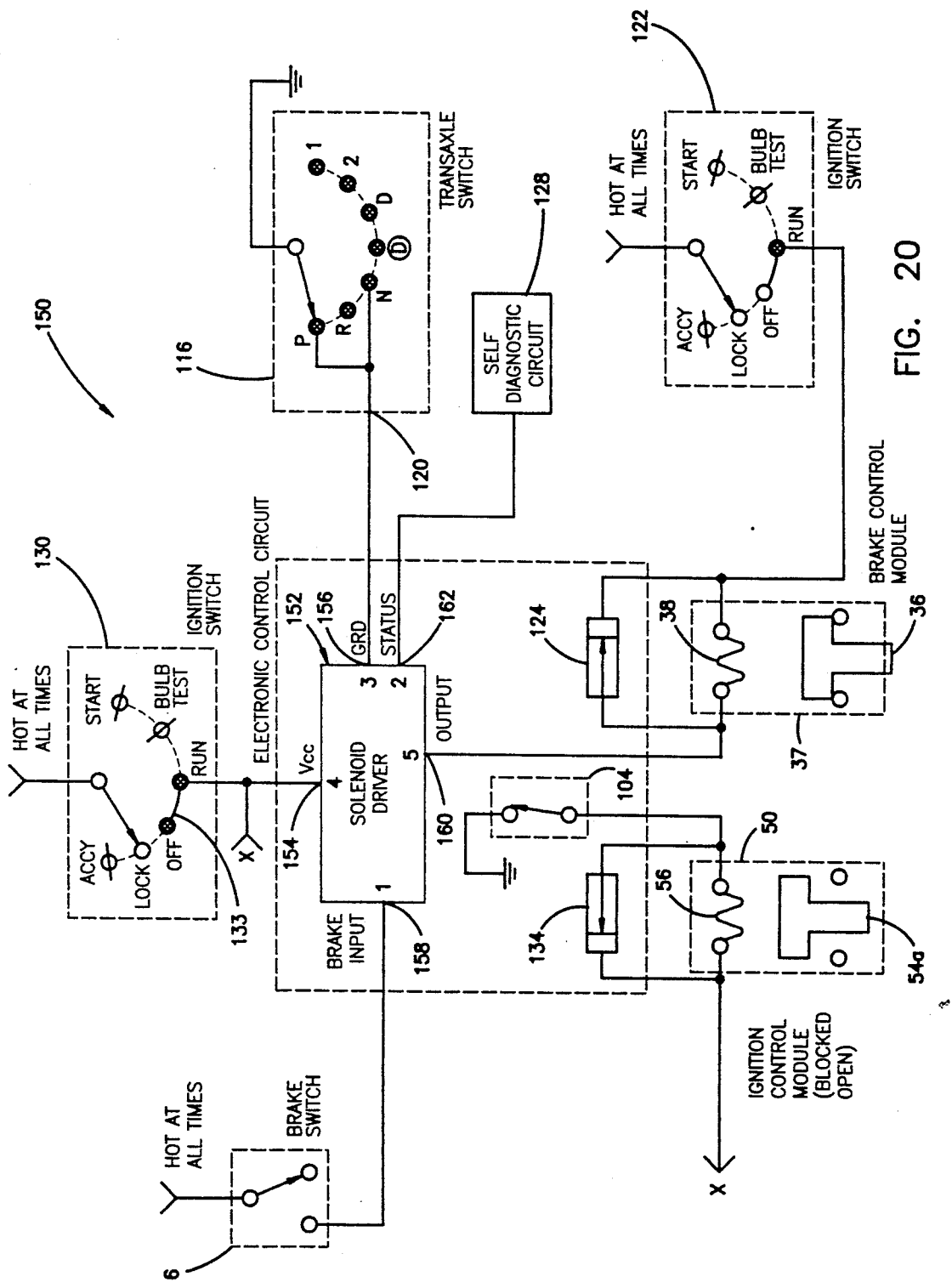
FIG. 20 is an electrical schematic diagram illustrating a modification of FIG. 19.

Ignition control module 50 includes a pin 54a that is normally extended but which is retracted when solenoid coil 56 is energized. A contact plate 138 opens contacts 140 and 142 when solenoid coil 56 is energized, contacts 140 and 142 being connected to self diagnostic circuit 128 for diagnostic functions such as to determine if a malfunction has occurred. In the embodiment illustrated in FIG. 20, button switch 104 is connected to node 121, which is selectively connected to ground through transaxle switch 116. Button switch 104 may also be connected directly to ground without harming the operation of circuit 100.

When key 8 is initially placed into ignition switches 122 and 130, circuit 100 is inactive. With the transaxle switch 116 in park, as ignition switch 130 is rotated past the "LOCK" position toward the "RUN" position, current flows through solenoid coil 56 retracting pin 54a. Any failure of pin 54a to retract is noted by the continuity through contacts 140, 142 and contact plate 138 to self diagnostic circuit 128. As ignition switch 122 reaches the "RUN" position, power is also communicated to solenoid coil 38. However, solenoid coil 38 does not retract pin 36 to release shifter lever 10 since current is not supplied to base 106 of transistor 102.

Brake switch 6 must be closed by depressing the vehicle brake in order for base current to be applied to base 106 of transistor 102. Once base current is applied to base 106, current flows from voltage source 114, through switch 122, coil 38, and collector 108 to emitter 110 and ground through transaxle position switch 116. The current through solenoid coil 3 retracts pin 36 allowing shifter lever 10 to be moved out of "PARK" position. As button 24 is depressed to disengage pawl 29 from detent plate 12, lockout arm 220 is rotated into contact with switch pin 104A causing shift button position switch 104 to break contact. This de-energizes solenoid coil 56 causing pin 54a to extend and prevent key 8 from being turned to the "LOCK" position (FIGS. 8 and 9) and also prevent the steering mechanism from being locked. As shifter lever 10 is moved from "PARK" position, the path to ground 119 is broken, causing current flow through solenoid coil 38 to cease. Although pin 36 is not held in a retracted position when current is not flowing through coil 38, the lockout arm 220 extends over pin 36 preventing extension of pin 36. Thus, the shift lever 10 is freely shiftable until it is shifted to "PARK".

If the driver releases the brake thus opening brake switch 6, while shifter lever 10 is in the "PARK" position, the path to ground 119 is broken and pin 36 extends thus locking crank 220 (FIG. 14) in place and locking shifter lever 10 in the "PARK" position. Also, if a driver continues to hold in button 29 after shifting to park, key 8 cannot be returned to the "LOCK" position since button position switch 104 de-energizes solenoid coil 56 allowing pin 54a to extend (FIGS. 8 and 9).

In the circuit illustrated in FIG. 19, transaxle switch 116 reestablishes ground at "NEUTRAL" position, which is exemplary of some switches used by automotive manufactures. However, in the present circuit 100, the continuity provided through "NEUTRAL" position of switch 116 is made ineffective by the position of lockout arm 220 which holds open shift position switch 104 when pawl 29 and shifter lever 24 are not in the park gear position (FIG. 15-16).

SECOND MODIFIED CIRCUIT

Circuit 150 (FIG. 20) is similar to circuit 100 (FIG. 19), but circuit 150 substitutes a solenoid driver 152 for transistor 102 to increase reliability and durability in the harsh environment of a vehicle. A solenoid driver, such as a commercially available integrated circuit No. LT1188 produced by Linear Technology Company, is contemplated to be satisfactory. Such a solenoid driver incorporates internal clamp diodes to clamp the negative voltage spikes generated by the inductive loads of solenoid coil 38, and further is capable of withstanding load dumps of 60 V as well as wide operating temperature variations. Further, the noted solenoid driver includes short circuit detection and shutoff means, open circuit detection, and over-temperature detection and shutoff means.

Solenoid driver 152 includes a voltage power-in terminal 154 which is connected to contact 133 of ignition switch 130, a ground terminal 156 connected to terminal 120 of transaxle switch 116, an input terminal 158 connected to brake switch 6, an output terminal 160 connected in series with solenoid coil 38 of brake control module 37 and the "RUN" position terminal of ignition switch 122, and a status terminal 162 connected to diagnostic circuit 128. Also in circuit 150, button switch 104 is connected directly to ground in series with coil 56 of ignition control module 50 and terminal 133 of ignition switch 130. Diodes 124 and 134 are connected across coils 38 and 56, respectively, to provide a discharge path therefor, as noted earlier.

The operation of circuit 150 (FIG. 20) is substantially similar to circuit 100 shown in FIG. 19. When key is initially placed into ignition switches 122 and 130, circuit 150 is inactive. With the transaxle switch 116 in park, as ignition switch 130 is rotated past the "LOCK" position toward the "RUN" position, current flows from ignition switch 130 through solenoid coil 56 retracting pin 54a. When ignition switch 122 is in the "RUN" position, power is supplied to solenoid 38. If brake switch 6 is open ("i.e., the vehicle brake pedal is not pressed"), solenoid driver 160 does not supply current at output 160 and thus does not supply current to coil 38. Thus, pin 36 is extended and blocks movement of shift lever 10 (FIG. 1).

The vehicle brake pedal must be pressed to activate the vehicle brakes and close brake switch 6. When the brake pedal is pressed, the control input of the solenoid driver 150 is connected to the vehicle power supply through switch 6. The supply voltage applied to input 158 controls the solenoid driver to provide an output current at terminal 160 The current flows through solenoid 38 causing pin 36 to retract and allowing shift lever 10 to be moved out of the "PARK" position. Transaxle switch 116A moves with lever 10 such that solenoid driver 152 is disconnected from ground by the movement of lever 10. When the solenoid driver is disconnected from ground, the solenoid driver stops supplying current to solenoid coil 38. As explained above, a lock out arm 220 extends over pin 36 preventing extension of that pin after current no longer flows through coil 38 such that lever 10 is freely movable until it is shifted to "PARK".

As described above, as button 24 (FIG. 1) is depressed to disengage ball 29 from detent plate 12, lock out arm 220 contacts switch pin 104A causing shift button position switch 104 to brake the contact. This de-energizes solenoid coil 56 causing pin 54A to extend preventing key 8 from being turned to the "LOCKED" position (FIGS. 8 and 9) and preventing the steering mechanism from being locked. Because switch 104 is connected directly to ground, current does not flow through coil 56 as long as button 24 is depressed. When button 24 is released, current again flows through coil 56 energizing solenoid coil 56 and causing pin 54A to retract. In the retracted position, key 8 can be turned to the "LOCK" position whereat the steering mechanism locks.

THIRD MODIFIED CIRCUIT

Figure 21:
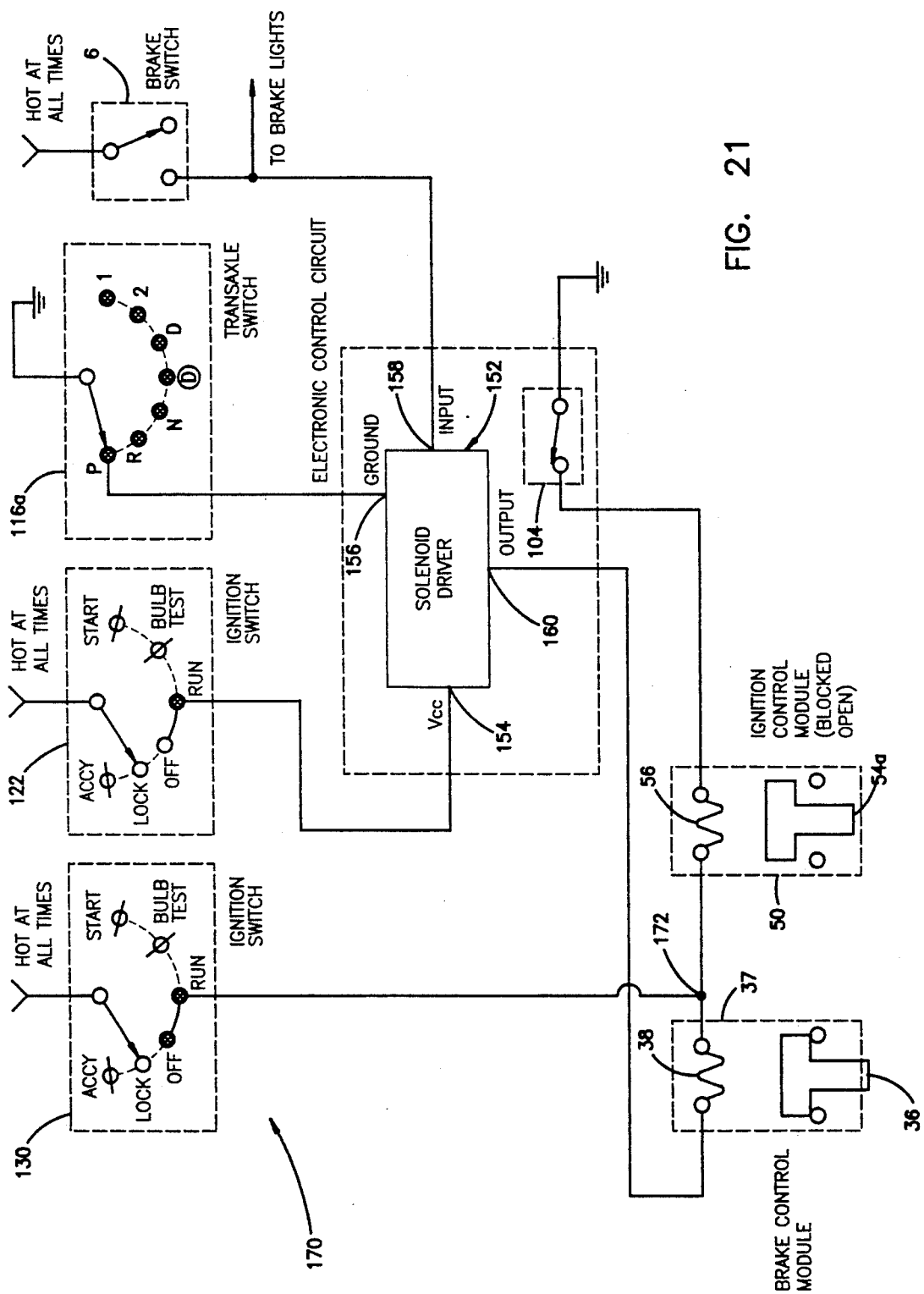
FIG. 21 is an electrical schematic diagram illustrating another modification of FIG. 19.

Circuit 170 (FIG. 21) illustrates another arrangement for actuating solenoid coils 38 and 56 of control modules 37 and 50, respectively. In circuit 170, voltage supply terminal 154 of solenoid driver 152 is connected to ignition switch 122, ground terminal 156 is connected to transaxle switch 116a, and input terminal 158 is connected to brake switch 6. Solenoid coil 38 is connected between output terminal 160 and node 172. Node 172 is connected to a voltage supply through ignition switch 130. Node 172 also is connected to coil 56 of ignition control module 50. Coil 56 is connected in series with shift button position switch 104 between node 172 and ground. Notably, circuit 170 is very similar to circuit 150, but in circuit 170, solenoid driver 152 is connected on the low voltage side or "down side" of coil 38. The solenoid driver 152 may be provided by any suitable commercially available down side solenoid driver. Additionally, circuit 170 includes a transaxle switch 116a that only provides continuity when in the "PARK" position. However, its operation is otherwise substantially similar to switch 116 of FIGS. 19 and 20.

When key 8 is initially placed into the ignition of the vehicle, circuit 170 is inactive. As key 8 is turned causing ignition switch 130 to move off the "LOCK" position of FIGS. 8-10, power is supplied to node 172. Current is supplied through solenoid coil 56 of ignition control module 50 and through button position switch 104 to ground. Pin 54a is thus retracted. As ignition switch 122 is moved to the "RUN" position, power is supplied to solenoid driver 152. When brake switch 6 is closed by pressing on the vehicle brake pedal, solenoid driver 152 is controlled to pull current into terminal 160. The current pulled into terminal 160 flows through solenoid coil 38. This current through solenoid 38 effects retracting of pin 36 of brake control module 37. When pin 36 is retracted, shifter lever 10 can be moved from "PARK" position. As shifter lever 10 is moved, transaxle switch 116a moves, which disconnects solenoid driver 56 from ground. When this occurs, current is no longer pulled through solenoid coil 38, and pin 36 is no longer held retracted. However, pin 36 is blocked in its retracted state and not allowed to extend due to crank 220 (FIGS. 15-16) as described above.

As button 29 is pressed to permit movement of lever 10, shift button position switch 104 opens. When switch 104 opens current no longer flows through solenoid coil 56 causing pin 54a to extend thus preventing key 8 from being removed and insuring that steering lockout mechanism 8A remains unlocked.

When shifter lever 10 is shifted back to "PARK" position, terminal 156 is reconnected to ground through transaxle position switch 116a and, if the brake switch 6 is closed, pin 36 is held retracted by current in solenoid coil 38. When shift button position switch 104 is closed, solenoid coil 56 is activated retracting pin 54a so that key 8 can be moved to the "LOCK" position of FIGS. 8-10. As key 8 and ignition switch 122 is rotated off the "RUN" position, solenoid driver 152 is disconnected from the vehicle battery and pin 36 extends locking shifter lever 10 in park. A ignition switch 130 is rotated fully into lock, solenoid coil 56 is disconnected from the vehicle battery and pin 54a extends, but key 8 is beyond the point at which pin 54a prevents the removal of key 8. Once key 8 is moved to the "LOCK" position, the steering lockout mechanism locks the steering gear and permits the key to be removed.

FOURTH MODIFIED CIRCUIT

Circuit 180 (FIG. 22) discloses an arrangement utilizing a logic circuit 182 to drive a driving circuit 184. Driving circuit 184 includes ignition switch 130 which provides power from terminal 133 to solenoid coils 38 and 56 of brake control module 37 and ignition control module 50, respectively. Solenoid coil 38 is selectively connected to ground through solid state switch 186, which can be selected from a variety of different commercially available switches such as bipolar or FET transistors. It is contemplated that switches 186 and 188 could include magnetic reed switches if desired. A suppression diode 124 is connected in parallel with solenoid coil 38 to protect the switching circuits. Similarly, solenoid coil 56 is connected to a second solid state switch 188 and to ground. Shift button position switch 104 is illustrated connected in series with switch 188. However, switch 104 can be removed without harming the operation of circuit 180. Diode 134 is also connected in parallel with solenoid coil 56 to protect the switching circuits.

Logic control circuit 182 includes a microcontroller 190 which is connected to, and receives signals from, transaxle switch 116a (or 116) and brake switch 6. Microcontroller 190 is also connected to contacts 46a and 46b of brake control module 37 and contacts 140 and 142 of ignition control module 50 to check for continuity to determine if pins 36 and 54a are extended. Microcontroller 190 is further operably connected to switches 186 and 188 to control the same and in turn control the operation of solenoid coils 38 and 56, and the retraction of pins 36 and 54a. The microcontroller may be implemented by a suitable commercially available microprocessor such as Integrated Circuit No Pic. 16C5X available from Microchip Technology Inc.

Figure 27:
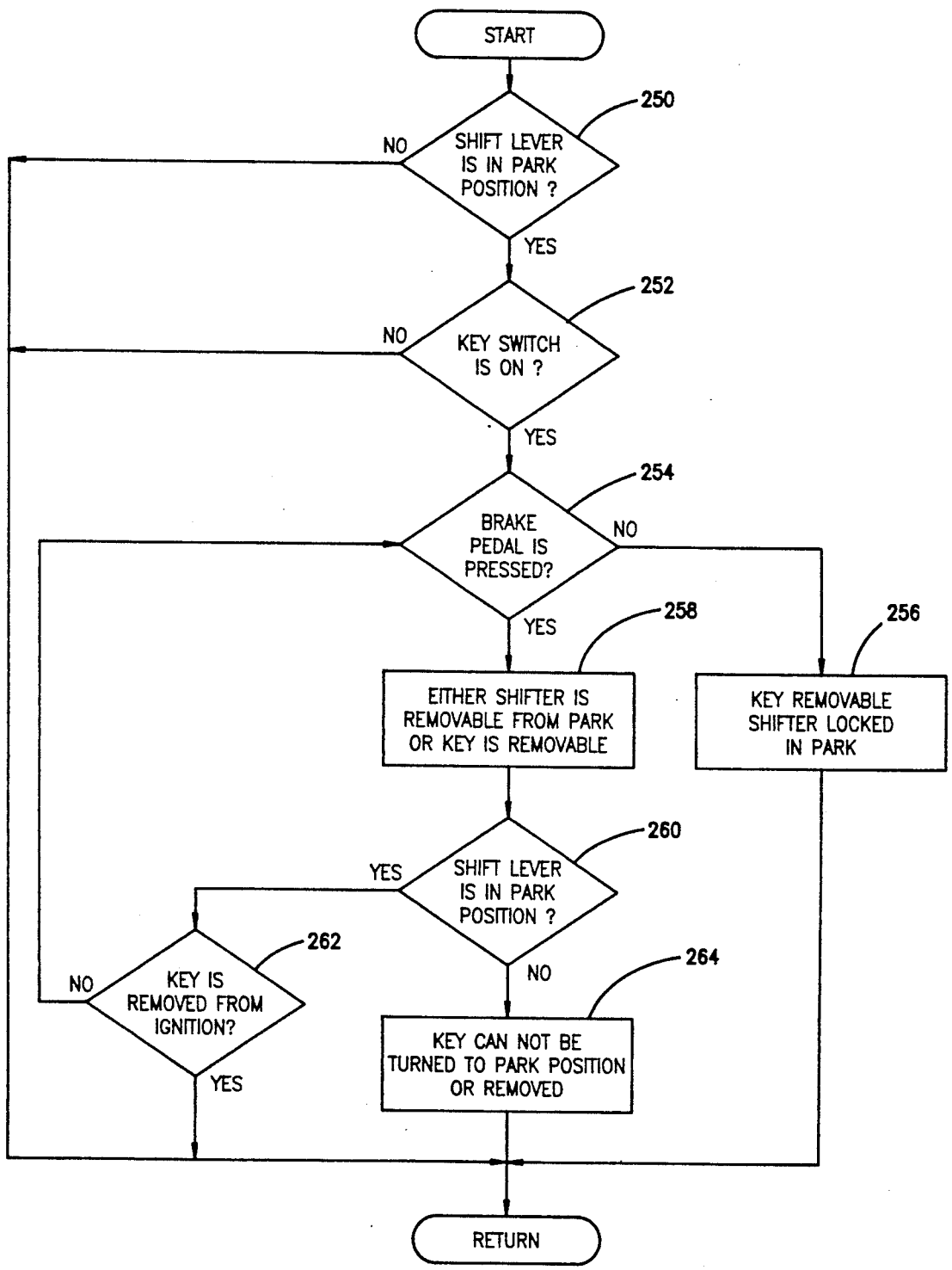
FIG. 27 is a logic flow diagram for the logic circuit.

A flow diagram for microcontroller 190 is shown in FIG. 27. The microcontroller 190 samples inputs thereto on a cyclical basis to determine the condition of brake switch 6 and transaxle switch 116a. In decision block 250, the microcontroller determines if shift lever 10 is in "PARK" position as indicated by transaxle switch 116a. If the shift lever is in "PARK" position in decision block 252, the microcontroller determines if ignition switch 130 is "ON". If either one of the conditions in decision block 250 and 252 are not met, then microcontroller 190 returns to wait for the next sampling cycle. If the shift lever is in "PARK" and the ignition switch is "on", microcontroller 190 determines if the brake pedal is pressed in decision block 254 (i.e. brake switch 6 is closed). If the brake pedal is not pressed, in block 256 the microcontroller outputs a control single which controls switch 186 to be in a non-conductive state and switch 188 to be in a non-conductive state whereby current does not flow through coil 38 and flows through coil 56. Accordingly, pin 36 is extended and pin 54a is retracted allowing key 8 to be removed but locking shift lever 10. If it is determined in decision block 254 that the brake is pressed, in block 258 microcontroller 190 outputs a control signal which controls switches 186 and 188 to be in a conductive state whereby current flows through coils 38 and 56. Accordingly, pins 36 and 54a are retracted allowing shift lever 10 to be removed from "PARK" position or key 8 to be removed. In decision block 260, the microcontroller 190 then determines if shift lever 10 has been moved from "PARK" position. If the lever has been removed from the "PARK" position, in decision block 262 the microcontroller 190 determines if key 8 is removed. If it is determined in block 262 that key 8 is not removed, microcontroller 190 returns to decision block 254. If it is determined in block 262 that key 8 is removed, microcontroller 190 returns and waits for the next input sampling cycle. If it is determined in block 260 that shift lever 10 is not in "PARK", controller 190 controls switch 188 to be in a non-conductive state such that pin 54a extends. This prevents steering mechanism 8a from being locked and also prevents key 8 from being removed. The microcontroller 190 then returns to wait for the next input sampling cycle.

FIFTH MODIFICATION

Figure 22:
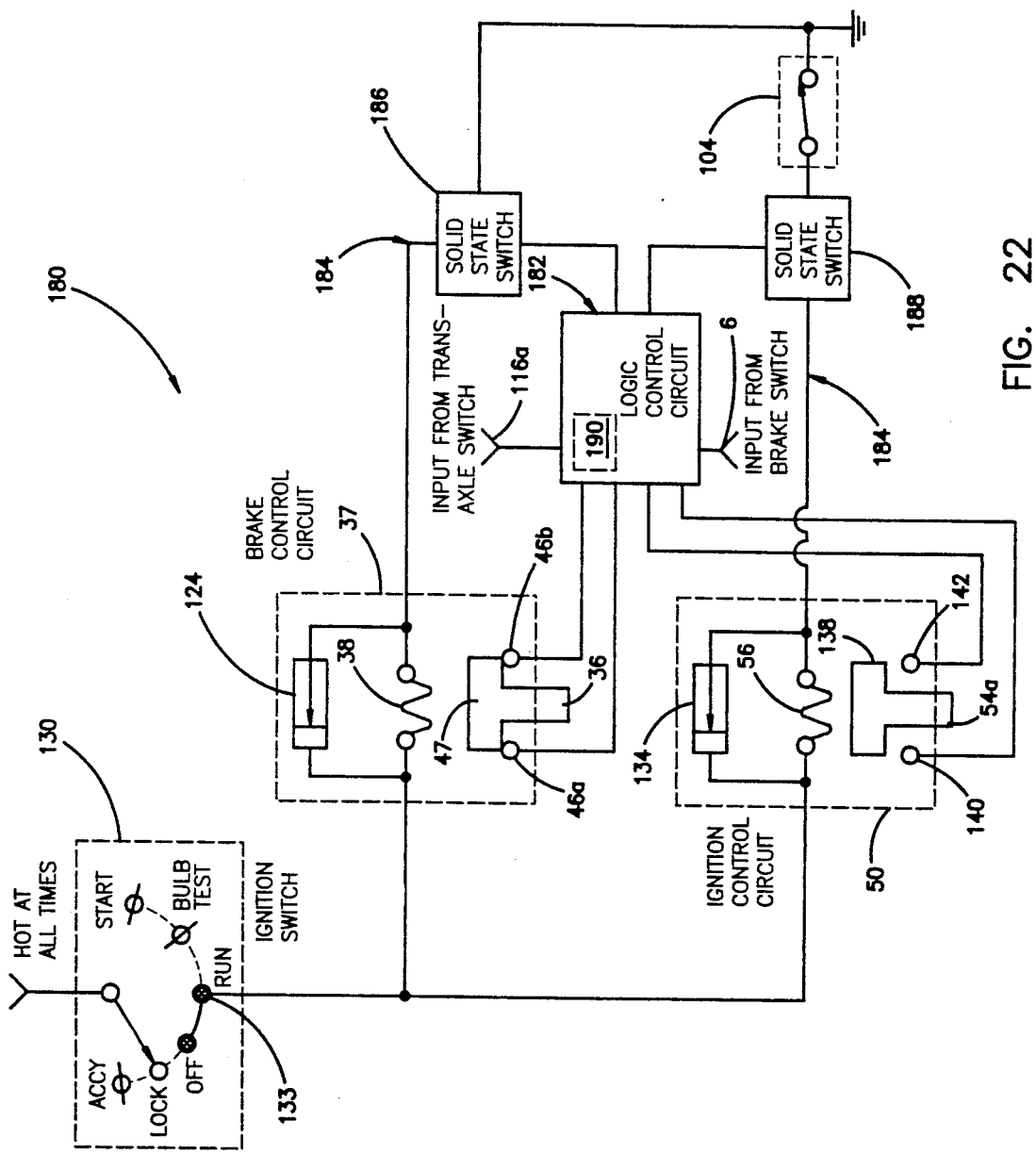
FIG. 22 is an electrical schematic diagram illustrating another modification of FIG. 19.
Figure 23:
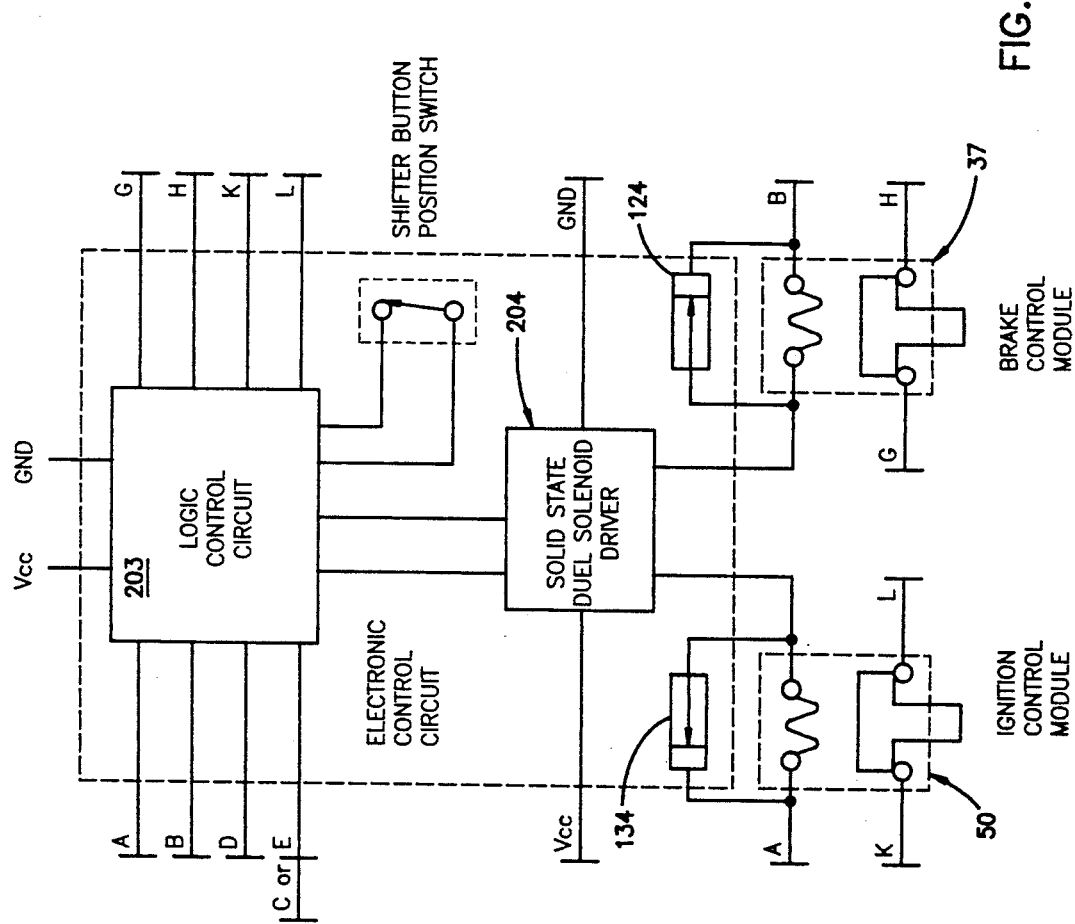
FIG. 23 is an electrical schematic diagram illustrating another modification of FIG. 19.
Figure 24:
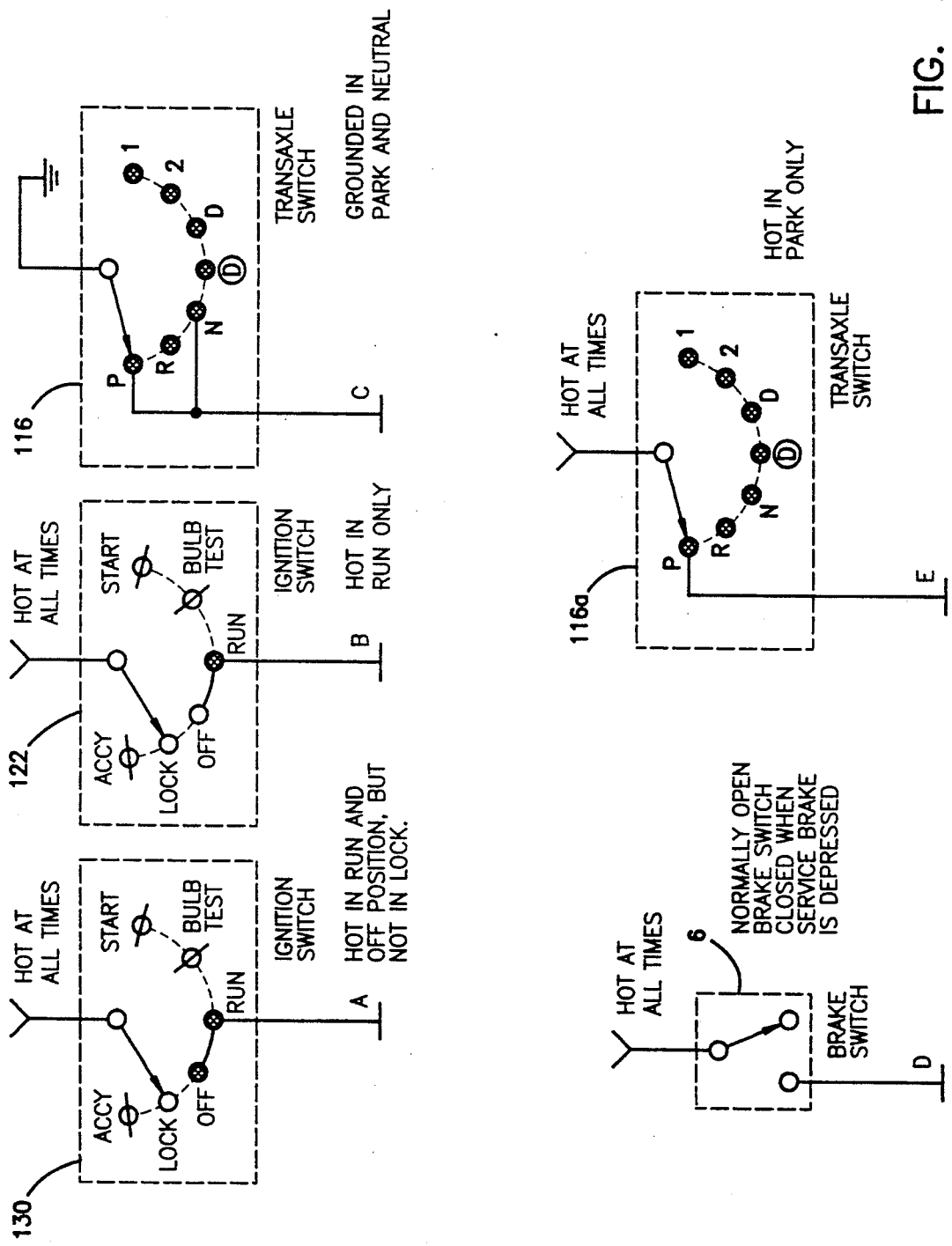
FIGS. 24 and 25 are components connected to terminals shown in FIG. 23.
Figure 25:
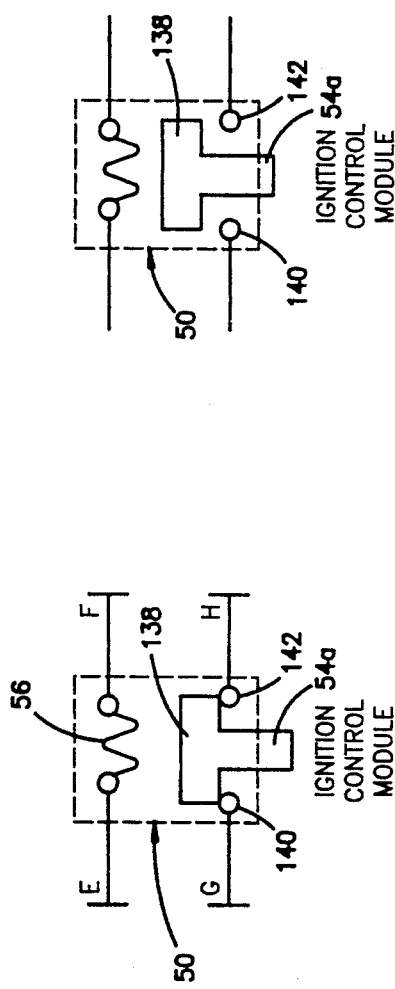

Circuit 200 (FIGS. 23–26) is similar to circuit 180, but includes two solid state solenoid drivers which may be provided by a dual solenoid driver in place of the two solid state switches 186 and 188 in FIG. 22. In FIGS. 23–25, letters "A", "B", and the like are used to represent electrical connections to simplify the drawings. Also, the designation "Vcc" represents input voltage to power the circuit, and "GND" represents a ground connection.

Circuit 200 includes logic control circuit 202 (FIG. 23) which in turn includes a microcontroller 203 with input power supply voltage "Vcc", ground "GND", and various inputs "A"–"E", "G", "H", "K", and "L". Based on these inputs and a predetermined program stored in controller 203, such as the program illustrated in the flow diagram shown in FIG. 27, controller 203 generates signals for controlling solenoid drivers 204a and 204b, which signals are communicated through wiring directly to dual solenoid driver 204. Dual solenoid 204 has its own connection to input voltage "Vcc" and to ground "GND".

Figure 26:
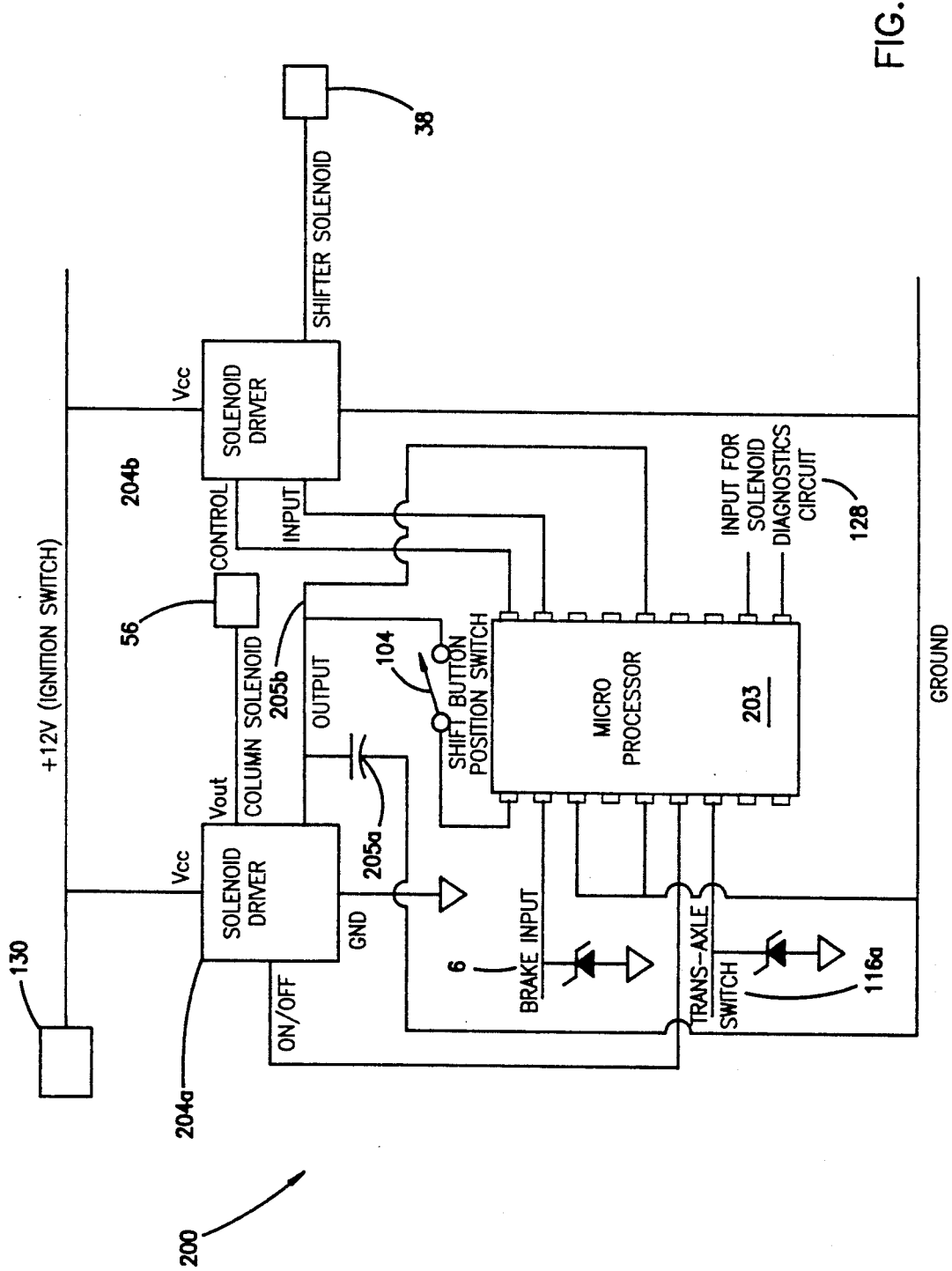
FIG. 26 is an electronic schematic for the microchip shown in FIG. 23.

An exemplary wiring diagram of circuit 200 is illustrated in FIG. 26. The circuit 200 includes a microcontroller 203 and two solenoid drivers 204a and 204b which may be provided in a single integrated circuit 204. The particular microcontroller 203 shown is sold under part number PIC 6C5X by Microchip Technology Inc. A capacitor 205a is connected between the output of solenoid driver 204a and ground to buffer the standby voltage output by solenoid driver 204a and supplied to microcontroller 203 along wire 205b. Capacitor 205a reduces the voltage peaks communicated by solenoid driver 204a to microcontroller 203.

It is contemplated that the dual solenoid driver 204 illustrated in FIG. 23 includes a solenoid driver 204a and 204b such as illustrated in FIG. 26 for driving both solenoid coils 38 and 56, respectively, but with the added advantage of drivers 204a and 204b being physically located beside solenoid 38. Thus, solenoid driver 204 requires less assembly time to mount driver 204 during assembly. This advantage is best illustrated in FIGS. 17 and 18.

SIXTH MODIFICATION

Circuit arrangement 250 (FIG. 28) is similar to circuit 100 in FIG. 19, but with the transistor eliminated and the circuit arrangement broken into cooperative but separately wired circuits. Specifically, circuit arrangement 250 includes separate circuits for controlling modules 37 and 50. In a first circuit, current is supplied by supply 114 to post 126 of ignition switch 122. Ignition switch 122 is operably connected in series to position switch 116a, brake switch 6, solenoid 38 of brake control module 37, and to ground 119. As previously discussed, ignition switch 122 provides continuity therethrough when in the "RUN" position, and position switch 116a provides continuity therethrough when in the "PARK" position. Also, brake switch 6 is normally open but is closed when the service brake pedal is depressed. Thus, with ignition switch 122 in the "RUN" position, the position switch 116a in the "PARK" position, and the brake switch 6 closed (i.e. the brake pedal depressed), current is supplied to solenoid coil 38 and to ground 119 causing pin 36 to retract in brake control module 37. With pin 36 retracted, pawl 29 can be moved and shifter lever 10 can be moved from "PARK" position to a gear position.

Also, in a second circuit, current is supplied by supply 114 to ignition switch 130. Ignition switch 130 is operably connected in series with shift button position switch 104, solenoid 56 of ignition control module 50, and ground 119. Ignition switch 130 provides continuity therethrough in the "RUN" and "OFF" positions as well as between those positions and a distance between "RUN" and "OFF" positions. Also, shift button position switch 104 is normally closed, but is held open when push button 24 is depressed moving pawl 29 out of "PARK" position and also held open when shifter lever 10 is moved out of "PARK" position. Thus, with ignition switch 130 providing continuity such as when in the "RUN" or "OFF" positions, and with position switch 104 closed and pawl 29 in the "PARK" position, current is supplied to solenoid coil 56 thus retracting pin 54a. With pin 54a retracted, the key 8 can be turned to the "LOCK" position and key 8 removed. Contrastingly, if position switch 104 is opened by shifter lever 10 being out of "PARK" position or by depressing button 29 to cause pawl 24 to move out of "PARK" position, pin 54a extends preventing key 8 from being removed.

SEVENTH MODIFICATION

Figure 28:
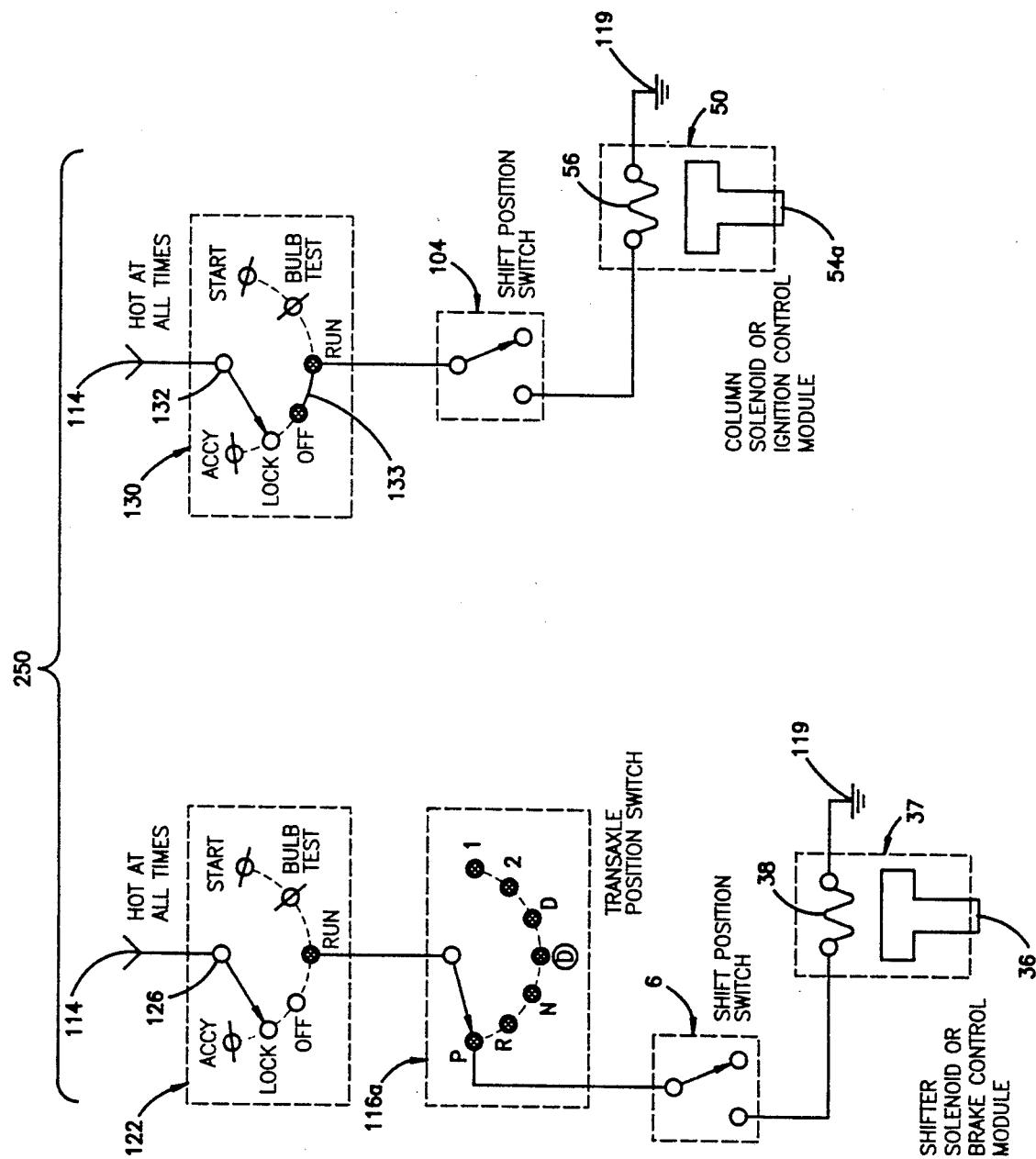
FIG. 28 is an electrical schematic diagram illustrating another modification of FIG. 19.
Figure 29:
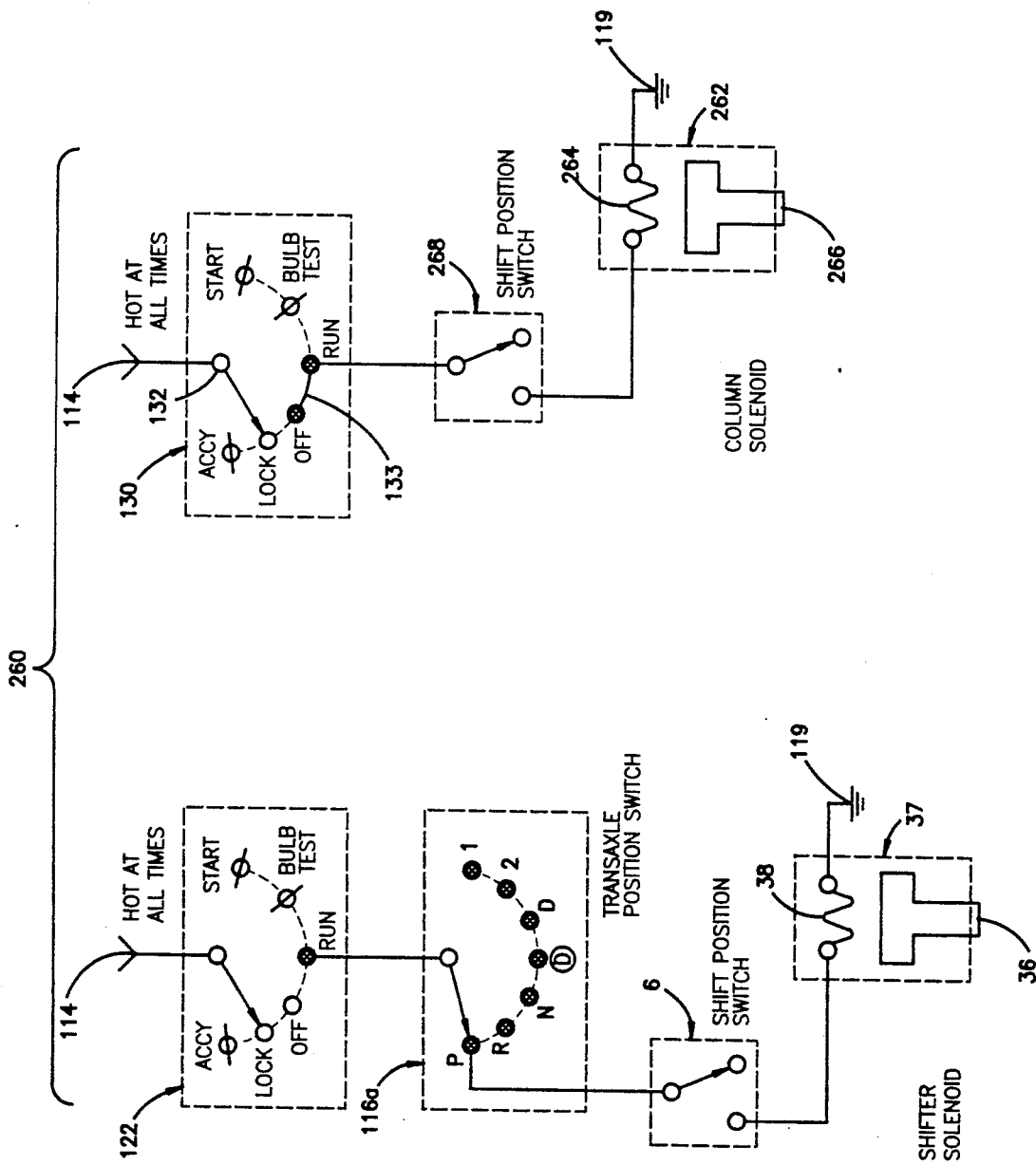
FIG. 29 is an electrical schematic diagram illustrating a modification of FIG. 28.

Circuit 260 (FIG. 29) is similar to circuit 220 in FIG. 28, but utilizes a normally open shift button position switch 268 in combination with a revised ignition control module 262 with solenoid coil 264 and pin 266. Brake control module 37 is connected in series with brake switch 6, position switch 116a, and ignition switch 122 the same as shown in circuit 220. The operation and control of brake control module 37 is also the same. In circuit arrangement 260, however, ignition switch 130 is connected in series with position switch 268 and solenoid coil 264 to ground 119. Position switch 268 operates substantially opposite switch 104. Position switch 268 is normally open, but closes when shift button 24 is depressed moving pawl 29 out of "PARK" position. Position switch 268 is further mechanically held closed when shifter lever 10 is moved out of "PARK" position. Current is thus provided to solenoid coil 264 of ignition control module 262 when ignition switch 130 provides continuity therethrough such as when in "OFF" or "RUN" positions and when position switch 268 is closed by pressing button 24 and moving pawl 29 out of "PARK" position. Pin 266 operates in reverse of pin 36 discussed previously. With solenoid coil 264 energized and pin 266 retracted, key 8 cannot be removed. With solenoid coil 264 de-energized and pin 266 extended, key 8 can be removed. It is envisioned that end 230 of lockout arm 220 can be revised by persons of ordinary skill in the art based upon the disclosure previously given herein. For example, a pivotable latch (not shown) could be operably connected to detent plate 12 and to pin 266 so that lockout arm 220 could not move unless pin 266 was extended to release the latch and in turn release lockout arm 220.

From the foregoing description, it may readily be observed by those skilled in the art that the present invention provides a novel lockout mechanism for an automatic shifter wherein the shifter is locked into PARK position unless the brake is applied and the steering lockout mechanism located in the steering column is released. The structure of the invention is relatively low in cost since the parts thereof readily lend themselves to formation as by stamping or are otherwise readily commercially available. Further, the mechanism includes a minimum of parts which are relatively easy to assemble, thereby resulting in cost savings, not only because of the reduced cost of the parts themselves but also in the labor costs.

Those skilled in the art will, of course, appreciate the many advantages of the present invention over that shown in the prior art and will also recognize that many modifications can be made without departing from the concept and spirit of the invention. It is, therefore, intended that the equivalent arrangements are to be included as part of this invention except as expressly excluded by the wording of the following claims.

The embodiments of the invention in which an exclusive property or privilege is claimed are defined as follows:

1. A combination brake/park lockout and steering lockout shifter mechanism and system for a vehicle having a shifter lever, a brake, and a steering mechanism comprising:

said shifter lever being shiftable from a park gear position to at least one drive gear position;

a shifter lever position sensor means for sensing the position of said shifter lever;

a brake sensor means for sensing the position of the brake for the vehicle;

a shifter lockout means for locking said shifter lever in a locked park position, said shifter lockout means being shiftable to an unlocked condition;

a steering lockout means for locking the steering mechanism of the vehicle in a "steering locked" position and also for unlocking the steering mechanism in a "steering unlocked" position;

an electrically operated brake control module for controlling said shifter lockout means, said brake control module in one state preventing the shifting of said shifter lever from said park gear position to said drive gear position and in another state permitting said shifting of said shifter lever from said park gear position to said drive gear position;

an electrically operated ignition control module, said ignition control module in one condition having means for permitting said steering lockout means to move from said "steering locked" position to said "steering unlocked" position and in another condition preventing said steering lockout means from moving from said "steering unlocked" position to said "steering locked" position; and a control circuit;

said shifter lever position sensor means and said brake sensor means being electrically connected to said control circuit;

said brake control module and ignition control module being electrically connected to said control circuit;

said control circuit including switch means for controlling the state of said brake control module and the condition of said ignition control module whereby while said shifter lever is in said locked park position, said ignition control module is in said one condition permitting said steering lockout means to be switched to said "steering unlocked" position, and after said steering lockout means is switched to said "steering unlocked" position and said shifter lever is shifted to one of said gear positions as permitted by said shifter lockout means being actuated to said unlocked condition, said ignition control module is in said another condition for preventing said steering lockout means from being moved from said "steering unlocked" position to said "steering locked" position.

2. The combination brake/park lockout and steering lockout shifter mechanism of claim 1 in which said switch means includes a transistor.

3. The combination brake/park lockout and steering lockout shifter mechanism of claim 1 in which said switch means includes a semiconductor adapted to drive a solenoid coil, and at least one of said brake control module and said ignition control module includes a solenoid coil electrically connected to and driven by said semiconductor.

4. The combination brake/park lockout and steering lockout shifter mechanism of claim 1 including a shifter pawl means operably connected to said shifter lever and shiftable in and out of a registered position for registering said shift lever in said park gear position, and further including a shifter switch means actuated by movement of said shifter pawl means out of said registered position, said shifter switch means being electrically connected to one of said logic circuit and said ignition control module so that when said shifter pawl means is out of said registered position, said ignition control module cannot be accidentally moved from said another condition which prevents said steering lockout means from moving from said "steering unlocked" position to said "steering locked" position.

5. A combination brake/park lockout and steering lockout shifter mechanism and system for a vehicle having a shifter lever, a brake, and a steering mechanism comprising:

said shifter lever being shiftable from a park gear position to at least one drive gear position;

a shifter lever position switch means operatively connected to said shifter lever;

a brake switch means operably connected to the brake for the vehicle;

a shifter lockout means for locking said shifter lever in a locked park position, said shifter lockout means being shiftable to an unlocked condition;

an ignition mechanism including a key switch and a steering lockout means for locking and unlocking the steering mechanism for the vehicle, said key switch being movable in a first direction from a "steering locked" position to at least one "run" position and in a second direction from said "run" position to said "steering locked" position;

an electrically operated brake control module for controlling said shifter lockout means, said brake control module in one state preventing the shifting of said shifter lever from said park gear position to said drive gear position and in another state permitting said shifting of said shifter lever from said park gear position to said drive gear position;

an electrically operated ignition control module, said ignition control module in one condition having means for permitting said key switch to move in said first direction from said "steering locked" position to said "run" position and in another condition preventing said key switch from moving in said second direction from said "run" position to said "steering locked" position; and a control circuit including a logic circuit and a driving circuit operably connected to and controlled by said logic circuit;

said shifter lever position switch and said brake switch being electrically connected to said logic circuit;

said brake control module and ignition control module being electrically connected to said driving circuit;

said driving circuit including switch means for controlling the state of said brake control module and the condition of said ignition control module whereby while said shifter lever is in said locked park position, said ignition control module is in said one condition permitting said key switch to be switched in said first direction to said "run" position, and after said key switch is switched to said "run" position and said shifter lever is shifter to one of said gear positions as permitted by said shifter lockout means being actuated to said unlocked condition, said ignition control module is in said another condition for preventing said key switch from being moved in said second direction from said "run" position to said "steering locked" position.

6. The combination brake/park lockout and steering lockout shifter mechanism of claim 5 including a shifter pawl means operably connected to said shifter lever and shiftable in and out of a registered position for registering said shifter lever in said park gear position, and further including a shifter pawl position switch means actuated by movement of said shifter pawl means out of said registered position, said shifter pawl position switch means being operably connected to said ignition control module so that when said shifter pawl means is out of said registered position, said ignition control module cannot be moved from said another condition which prevents said key switch from moving in said second direction to said "steering locked" position.

7. The combination brake/park lockout and steering lockout shifter mechanism of claim 5 wherein said control circuit includes two separate switches controlled by said control circuit, one for each of said brake control module and said ignition control module.

8. The combination brake/park lockout and steering lockout shifter mechanism of claim 5 wherein said control circuit includes a solenoid driver means to drive a solenoid coil, and at least one of said brake control module and said ignition control module includes a solenoid coil electrically connected to said solenoid driver means.

9. The combination brake/park lockout and steering lockout shifter mechanism of claim 8 wherein said solenoid driver means includes a semiconductor adapted to drive a solenoid.

10. The combination brake/park lockout and steering lockout shifter mechanism of claim 8 including a diagnostic circuit, and wherein said at least one of said brake control module and said ignition control module includes an extendable solenoid pin operably connected to said solenoid coil, and further includes contacts actuatable by said solenoid pin, said contacts being electrically connected to said diagnostic circuit, whereby said diagnostic circuit senses if said solenoid pin has been extended.

11. The combination brake/park lockout and steering lockout shifter mechanism of claim 5 wherein said shifter lockout means includes a detent plate and a flat crank movably attached to said detent plate, and said brake control module includes a solenoid coil and solenoid pin operably mounted to said detent plate so that said solenoid pin can be extended to prevent movement of said flat crank and in turn prevent movement of said shifter lever out of the park gear position.

12. The combination brake/park lockout and steering lockout shifter mechanism of claim 11 including a first housing attached to said detent plate opposite said solenoid coil and said solenoid pin, and further including a shifter switch means located in said first housing and operably connected to said control circuit to sense the position of one of said flat crank or said solenoid pin when said shifter lever is in said park position, thus sensing the movement of said shifter lever from said park position.

13. The combination brake/park lockout and steering lockout shifter mechanism of claim 12 including a second housing for enclosing said solenoid coil, said second housing being attached to said detent plate opposite said first housing, said first and second housing providing an enclosure for said control circuit.

14. The combination brake/park lockout and steering lockout shifter mechanism of claim 13 wherein said first and second housings define a slot through which said flat crank partially extends.

15. The combination brake/park lockout and steering lockout shifter mechanism of claim 5 wherein said control circuit includes a microcontroller.

16. The combination brake/park lockout and steering lockout shifter mechanism of claim 5 wherein said logic circuit includes a microchip programmed to control said brake control module and said ignition control module based on inputs from said shifter lever position sensor means and said brake sensor means.

17. The combination brake/park lockout and steering lockout shifter mechanism of claim 16 wherein said microchip has an internal fuse for protection of circuitry therein.

18. A combination brake/park lockout and steering lockout shifter mechanism and system for a vehicle, including:
  a shifting mechanism being shiftable from a park position to at least one drive gear position;
  a brake mechanism for braking the vehicle;
  a steering mechanism for steering the vehicle;
  first means for disabling said steering mechanism so that said steering mechanism cannot be used;
  second means for sensing if said steering mechanism is disabled;
  third means for sensing if said brake mechanism is applied;
  fourth means for disabling said shifting mechanism;
  fifth means for sensing if said shifting mechanism is disabled; and
  a control circuit including a logic circuit and a driving circuit operably connected to said logic circuit, said logic circuit including a controller connected at least to said second means, said third means, and said fifth means, and said driving circuit operably connected to said first means and fourth means, said controller being programmed to control said first means and said fourth means through said driving circuit in response to signals received from said second means, said third means, and said fifth means so that said shifting mechanism is disabled if said shifting mechanism is in the park position unless the brake is pressed, and also so that said steering mechanism is enabled if said shifter mechanism is enabled.

19. The combination brake/park lockout and steering lockout shifter mechanism of claim 18 including an ignition mechanism including a key switch being movable from an operative position to a predetermined release position; and further including sixth means for preventing the key switch from being moved from said operative position to said predetermined release position, said sixth means being operably connected to said first means for disabling said steering mechanism so that said key switch cannot be moved to said release position if the shifter mechanism is enabled.

20. A combination brake/park lockout and steering lockout shifter mechanism and system for a vehicle having a shifter lever, a brake, and a steering mechanism comprising:
said shifter lever being shiftable from a park gear position to at least one drive gear position;
a shifter lever position switch means operatively connected to said shifter lever and including a first position indicating said shifter lever is in said park gear position and a second position indicating that said shifter lever is in said at least one drive gear position;
a brake switch means operably connected to the brake for the vehicle and including a first position indicating the brake is depressed and a second position indicating the brake is not depressed;
a shifter lockout means for locking said shifter lever in a looked park position, said shifter lockout means being shiftable to an unlocked condition;
an ignition mechanism including a key switch and a steering lockout means for locking and unlocking the steering mechanism for the vehicle, said key switch being movable in a first direction from a "steering locked" position to at least one "run" position and in a second direction from "run" position to "steering locked" position;
an electrically operated brake control module for controlling said shifter lockout means, said brake control module in one state preventing the shifting of said shifter lever from said park gear position to said drive gear position and in another state permitting said shifting of said shifter lever from said park gear position to said drive gear position;
an electrically operated ignition control module, said ignition control module in one condition having means for permitting said key switch to move in said first direction from said "steering locked" position to said "run" position and in another condition preventing said key switch from moving in said second direction from said "run" position to said "steering locked" position;
a shift button/pawl position switch operably connected to said shifter lockout means, said shift button/pawl position switch including a first position indicating said shifter lockout means is in said locked park position, and a second position indicating that said shifter lockout means is in said unlocked condition;
a brake control module circuit including said shift lever position switch means and said brake switch, said shift lever position switch means and said brake switch being connected in series and operably connected to said brake control module to control the state of said brake control module so that said brake control module is in said one state preventing the shifting of said shifter lever from said park gear position when either said brake switch is in said second position indicating the brake is not depressed or said shift lever position switch means is in said second position indicating said shifter lever is not in said park position, and said brake control module is in said another state when both said brake switch is in a position indicating the brake is depressed and said shift lever position switch means is in said park position; and
an ignition control module circuit including said shift button/pawl position switch, said shift button/pawl position switch being operably connected in series to said ignition control module to control the condition of said ignition control module so that said ignition control module is in said another condition preventing said key switch to move in said second direction from said "run" position to said "steering locked" position when said shift button/pawl position switch is in said second position.

* * * * *

UNITED STATES PATENT AND TRADEMARK OFFICE
CERTIFICATE OF CORRECTION

PATENT NO. : 5,211,271

DATED : May 18, 1993

INVENTOR(S) : Charles Osborn et al.

It is certified that error appears in the above-indentified patent and that said Letters Patent is hereby corrected as shown below:

Column 3, lines 31 and 32:
 "plane VI-VI" should be --plane IV-IV--.

Column 8, line 23:
 "housing 21" should be --housing 211--.

Column 11, line 28:
 "coil 3" should be --coil 38--.

Column 12, line 27:
 "key" should be --key 8--.

Column 12, line 46:
 After "terminal 160" insert --.--.

Column 13, line 66:
 "A" should be --As--.

Column 14, line 57:
 "single" should be --signal--.

Column 16, line 41:
 "circuit 220" should be --circuit 250--.

UNITED STATES PATENT AND TRADEMARK OFFICE
CERTIFICATE OF CORRECTION

PATENT NO. : 5,211,271
DATED : May 18, 1993
INVENTOR(S) : Charles Osborn et al

It is certified that error appears in the above-indentified patent and that said Letters Patent is hereby corrected as shown below:

Column 16, line 48, "circuit 220" should read --circuit 250--

Signed and Sealed this

Twelfth Day of April, 1994

*Attest:*

BRUCE LEHMAN

*Commissioner of Patents and Trademarks*

*Attesting Officer*